(12) United States Patent
Ishikawa et al.

(10) Patent No.: US 7,646,975 B2
(45) Date of Patent: Jan. 12, 2010

(54) IMAGING APPARATUS

(75) Inventors: Kensaku Ishikawa, Saitama (JP);
Yukiko Ichisawa, legal representative,
Tokyo (JP); Hidenori Ishibashi,
Kanagawa (JP)

(73) Assignee: Sony Corporation, Tokyo (JP)

( * ) Notice: Subject to any disclaimer, the term of this patent is extended or adjusted under 35 U.S.C. 154(b) by 300 days.

(21) Appl. No.: 10/551,165

(22) PCT Filed: Mar. 24, 2004

(86) PCT No.: PCT/JP2004/004126

§ 371 (c)(1),
(2), (4) Date: Jul. 20, 2006

(87) PCT Pub. No.: WO2004/088412

PCT Pub. Date: Oct. 14, 2004

(65) Prior Publication Data

US 2007/0177863 A1    Aug. 2, 2007

(30) Foreign Application Priority Data

Mar. 28, 2003 (JP) ............................... 2003-91700
Mar. 3, 2004 (JP) ............................... 2004-59242

(51) Int. Cl.
*G03B 15/03* (2006.01)
(52) U.S. Cl. ...................... 396/177; 348/371
(58) Field of Classification Search ................. 396/177; 348/371; 362/3, 16, 18
See application file for complete search history.

(56) References Cited

U.S. PATENT DOCUMENTS 5,331,362 A * 7/1994 DiRisio ...................... 396/62
5,502,530 A * 3/1996 Kaihara et al. .............. 396/175
2002/0028073 A1* 3/2002 Katagiri ...................... 396/177

(Continued)

FOREIGN PATENT DOCUMENTS

JP     62-121428      6/1987

(Continued)

OTHER PUBLICATIONS

International Search Report dated Jul. 13, 2004.

(Continued)

*Primary Examiner*—Christopher E Mahoney
*Assistant Examiner*—Autumn Parker
(74) *Attorney, Agent, or Firm*—Rader, Fishman & Grauer PLLC

(57) ABSTRACT

An imaging apparatus includes an exterior ease to which a lens device is attached, a base plate supported in the vicinity of an objective lens of the lens device, a flashlight device pivotally connected to the base plate and capable of moving between a pop-up position and a storage position through a turning arm, a spring device that makes the flashlight device pop up to be urged to the pop-up position with the spring device in contact with the base plate and the flashlight device and a holding device for holding the flashlight device in the storage position with the holding device fixedly connected to the base plate and releasably connected to the flashlight device in the storage position. The pop-up angle of the flashlight device is set at 20 degrees or less and a light emitting portion faces the front of a subject in the pop-up position.

11 Claims, 14 Drawing Sheets

U.S. PATENT DOCUMENTS

2002/0122666 A1* 9/2002 Miyazaki et al. ............ 396/178
2005/0200745 A1* 9/2005 Lee ........................... 348/371

FOREIGN PATENT DOCUMENTS

| JP | 09-080593 | 3/1997 |
| JP | 09-166815 | 6/1997 |
| JP | 09-197497 | 7/1997 |
| JP | 2000-227625 A | 8/2000 |
| JP | 2001-278525 A | 10/2001 |
| JP | 2001-318408 A | 11/2001 |
| JP | 2002-090841 | 3/2002 |
| JP | 2002-250962 | 9/2002 |

OTHER PUBLICATIONS

Japanese Office Action issued Sep. 8, 2009 for corresponding Japanese Application No. 2004-059242.

* cited by examiner

IMAGING APPARATUS

TECHNICAL FIELD

The present invention relates to an imaging apparatus including a flashlight device capable of selectively moving to a pop-up position and storage position, and particularly to the imaging apparatus in which a pop-up angle of the flashlight device is made smaller and the shape of a reflecting mirror is devised so that the whole of the apparatus is miniaturized and made thinner and the number of components thereof can be reduced.

BACKGROUND ART

As a conventional imaging apparatus of this kind, there is one, for example, described in Patent document 1 which is formerly applied for a patent by the applicant of the present invention. In this Patent document 1, there is a description regarding a pop-up mechanism of a flashlight device and a camera apparatus including the mechanism. The pop-up mechanism of the flashlight device includes a flashlight device that is supported and is capable of moving between a pop-up position and storage position, spring means urging the flashlight device to the pop-up position, an activating member having locking means for holding the flashlight device in the storage position and a plunger linked with the activating member, whose magnetically attracting force is released when electricity is turned on.

Then, when the flashlight device is in the stored state, the activating member is drawn by a magnetic force generated at the plunger against the spring force of the spring means and an operation of holding the flashlight in the storage position is carried out by using the locking means. Further, by applying current to the plunger to release the magnetic attraction, the locking means is moved backward with the spring force of the spring means and the flashlight device is made to spring up to the pop-up position.

According to the pop-up mechanism of this flashlight device, since the pop-up mechanism can be obtained with a small space and the number of components can drastically be reduced, miniaturization, weight saving and inexpensive manufacture of the flashlight become possible.

Further, as another conventional imaging apparatus, there is one, for example, described in Patent document 2. In the patent document 2, there is described an imaging apparatus with respect to a single lens reflex camera integrating a flashlight device. The single lens reflex camera is characterized by including light-emitting means in the vicinity of the upper part of a pent-a-prism of the finder optical system through a rise-up mechanism, and the light-emitting means occupy two positions such as a projecting position and a storage position by the rise-up mechanism.

According to the single lens reflex camera having such a constitution, since a light-emitting tube is integrated in the upper part of the pent-a-prism, photoflash shooting, daytime synchronized-shooting and the like can be performed with the same ease as is the case of a conventional compact camera.

In addition, as a prior art of the present invention by this applicant with respect to the imaging apparatus of the present invention, there is one, for example, described in Patent document 3. In the patent document 3, there are descriptions with respect to a reflecting mirror used in an electronic flashlight device that irradiates as a whole light directly irradiated from a light source and light reflected from a reflecting surface on a subject, and an electronic flashlight device using the reflecting mirror. The reflecting mirror for the electronic flashlight device is characterized in that a pair of first reflecting surfaces made of part of a cylindrical curved surfaces opposed to each other and a second reflecting surface which is continuous from the pair of first reflecting surfaces and in which a light source is stored are included, and continuous portion in which the pair of first reflecting surfaces and the second reflecting surface are continued is set at the opening portion side of the first reflecting surface rather than the central portion of the stored light source.

According to the electronic flashlight device reflecting mirror having such a constitution, the following effectiveness can be obtained that all or most of reflecting light can be emitted to the front from the opening portion at a predetermined light distribution angle, whereby the electronic flashlight device can be made thinner and miniaturized while maintaining a predetermined optical capability.

Patent document 1
   Published Japanese Patent Application 2002-250962 (page 4, FIG. 4)

Patent document 2
   Published Japanese Patent Application S62-121428 (page 3, FIG. 2A, FIG. 2B)

Patent document 3
   Japanese Patent Application 2003-151190

However, in any one of the pop-up mechanism of the flashlight device of the patent document 1 and that of the single lens reflex camera of the patent document 2 with respect to the prior art mentioned above, since a pop-up angle is as large as 35 degrees in an impact test and the like of a projecting body when the flashlight device was in the state of being made to spring up to the pop-up position, there was a problem that the thickness of sheet metal that becomes a structural thing had to be made thicker or the structural thing had to be so structured as to be resistant to transformation in order to secure enough strength. Further, in the case of the pop-up mechanism of the flashlight device of the patent document 1, there had been a problem that since a pop-up rock plunger was disposed on the rear side of a pop-up shaft, the flashlight device became large, with the result that when it was incorporated into a set, a camera device became inevitably large.

These problems will be explained further in detail. FIG. 16 shows FIG. 2 described in the patent document 2 and is a schematic perspective view of a camcorder (video-tape recorder) 100 with a flashlight device in the state of being made to spring up to a pop-up position. Further, FIG. 17 shows FIG. 4 similarly described in the patent document 1 and is a cross-sectional view of the flashlight device being in an operational state of being popped up from the camcorder 100.

In FIG. 16, a symbol 101 is an exterior case, a symbol 102 is a lens device, a symbol 103 is a microphone device, a symbol 104 is a view-finder, respectively. Further, a symbol 105 is a liquid crystal display, a symbol 106 is a photo-button for taking still images, a symbol 107 is a mode-switch lever for selectively switching among a video mode, power off, camera mode and memory mode and a symbol 108 is a flashlight device.

The flashlight device 108 is disposed at the upper front side of the exterior case 101 and is capable of selectively being in a storage position or in a pop-up position by a pop-up mechanism. That is, the flashlight device 108 is stored in a stroboscope storage portion 109 of the exterior case 101 when the amount of light for a subject is secured at a time of shooting a still image, and is in a non-use state in the storage position. On the other hand, when the amount of light for a subject for shooting a still image is insufficient, the flashlight device 108 is made to spring up from within the stroboscope storage portion 109, moves to an upper pop-up position and becomes a usable state.

The pop-up mechanism 110 of this flashlight device 108 has a constitution shown in FIG. 17. Namely, the pop-up mechanism 110 includes a base frame 111 fixed to the exterior case 101, an activating member 112 supported by the base frame 111 to turn in the horizontal direction, a plunger mechanism 113 attached to the base frame 111, a movable frame 114 supported by the base frame 111 to turn upward and downward, a coil spring 115 urging the movable frame 114 upward and the like.

The base frame 111 has a pair of bearing pieces 117 opposed to each other and a supporting shaft 118 is supported at its both ends by the pair of bearing pieces 117. To the supporting shaft 118 is supported the movable frame 114 to turn upward and downward and is loaded the coil spring 115. One spring piece 115a of the coil spring 115 is locked with one bearing piece 117 and the other spring piece 115b is locked with the movable frame 114, and the movable frame 114 is constantly urged upward with the spring force of the coil spring 115. By pressing downward a free-end side of the movable frame 114 against the spring force of the coil spring 115, the movable frame 114 is made capable of turning from the state of facing up diagonally to the state of facing horizontally.

The turns of the movable frame 114 are controlled by the activating member 111 and the turns of the activating member is controlled by the plunger mechanism 113. The plunger mechanism 113 includes an attaching portion 120 fixed to the base frame 111, a pair of magnets supported by the attaching portion 120, a pair of bobbins 122 loaded to each of the magnets, whose outer circumference is wound with a coil 121, a plunger movable portion 123 formed of a bifurcated iron piece inserted from an opening side of the bobbin, and the like. Further, the tip part of the iron piece that is the plunger movable portion 123 is magnetically attracted by the magnets.

In the plunger mechanism 113 having such a constitution, when the coil 121 is not in a current-applied state, the iron piece is attracted by the magnetically attracting force generated in the magnet, which makes it possible to acquire an operation to pull the activating member 111. On the other hand, when the coil 121 is in a current-applied state, an electromagnetic force generated in the coil makes the magnetic force of the magnet disappear, which releases the force of the activating member 111 for pulling the iron piece. Further, the activating member 111 includes a hook piece 111a raised vertically and a projection that is made to engage with a plunger movable surface 123.

The flashlight device 108 is fixed to the free-end side of the movable frame 114. The flashlight device 108 includes an upper cover 130 and lower cover 131, stroboscope frame 132, reflector 134 with a light emitter tube 133 loaded thereto and diffusing lens 135, trigger coil 136 and the like. The upper cover 130 and the lower cover 131 are superposed to form a stroboscope housing. Within the stroboscope housing are disposed a trigger coil 136, stroboscope frame 132 and reflector 134 in turn from the back and the diffusing lens 135 is disposed the farthest outside so as to put a lid on the opening side of the reflector 134.

With the flashlight device 108 having such a constitution that is operated to move up and down by the pop-up mechanism 110, since a rise-and-fall angle is as large as approximately 35 degrees, there had occurred the following problems. Namely, as is apparent from FIG. 16, since the flashlight device 108 is projected largely upward on the exterior case 101 at the time of a pop-up, the inside of the stroboscope storage portion 109 is in the state of coming into full view.

Therefore, in order for an inside structure not to be shown, this prior art was so constituted to provide a part that became the bottom of the stroboscope portion 109 in the exterior case 101 so that the exterior case 101 itself served as a cover, which made the inside structure not shown. As a result, since the thickness of the part that became the bottom of the stroboscope storage 109 was not only added to the height of the camcorder 100 but spaces produced up and down the bottom part were added to the height of the camcorder 100, the total amounts of the thickness and the space parts is the overall height of the apparatus, with the result that the problem of the size of the camcorder 100 became larger.

DISCLOSURE OF THE INVENTION

The problem the present invention aims to solve is that since a pop-up angle of the pop-up mechanism in a conventional imaging apparatus is large, when a flashlight device moves to a pop-up position, a stroboscope storage portion becomes wide open, with the result that the inside of an exterior case becomes the state of being easily peeped into. In trying to hide the inside of the exterior case, there arises the need of covering the bottom of the stroboscope storage portion with the exterior case itself or any other member, with the result that the size of the exterior case becomes large. As the result, it becomes impossible to miniaturize and make thinner an imaging apparatus of this kind.

An imaging apparatus according to claim 1 of the present application includes: an exterior case to which a lens device is attached; a flashlight device supported in the vicinity of an objective lens to be capable of moving between a pop-up position and a storage position through a turning arm; spring means for popping up the flashlight device to be urged to the pop-up position; and holding means for holding the flashlight device in the storage position, wherein the pop-up angle of the flashlight device is set at 20 degrees or less and a light emitting portion is made to face the front of a subject when the flashlight device is in the pop-up position.

An imaging apparatus according to claim 2 of the present application is characterized in that the flashlight device is disposed in the upper direction of the holding means adjacently in the vicinity of the objective lens.

An imaging apparatus according to claim 3 of the present application is characterized in that the flashlight device includes a reflecting mirror having a pair of first reflecting surfaces opposed to each other, the surface being formed of part of a cylindrical curved surface and a second reflecting surface continuous with the pair of first reflecting surfaces, in which a light source is stored, and a continuous portion, where the pair of first reflecting surfaces and the second reflecting surface continue, is set at a position on the opening portion side of the pair of first reflecting surfaces, which is displaced from the central portion of the stored light source.

An imaging apparatus according to claim 4 of the present application is characterized in that a second reflecting surface includes: a cylinder-like cylindrical surface portion obtained by making the central portion of a light source be the center of curvature radius; a pair of parallel plane portions that are provided in part of the cylindrical surface portion and are developed in approximately parallel with a central surface that makes the pair of first reflecting surfaces symmetrical; and a pair of inclined plane portions that are provided in part of the cylindrical surface portion and are extended in the tangent line direction from a first intersecting portion, at which an extended line of the line connecting the continuous portion to the central portion intersects the cylindrical surface portion, to a second intersecting portion at which the pair of inclined plane portions intersect the parallel plane portions.

An imaging apparatus according to claim 5 of the present application is characterized by making smaller the length between a pair of continuous portions that connect a pair of reflecting surfaces to a second reflecting surface than the diameter of the cylindrically curved surface portion constituting part of the second reflecting surface.

An imaging apparatus according to claim 6 of the present application is characterized in that the second reflecting surface is formed into an elliptical shape so that the position of a light source adjustably moves along the central surface of the second reflecting surface.

An imaging apparatus according to claim 7 of the present application is characterized in that the second reflecting surface includes: a curved surface obtained by making the central portion of a light source be the center of a curvature radius; a pair of parallel plane portions developed in approximately parallel with the central surface from a vertical intersecting portion at which the curvature radius intersects a vertical surface that passes the central portion and vertically intersects the central plane; and a pair of inclined plane portions which are continuous on one side of the curved surface portion and which are extended and developed in the tangent line direction from the first intersecting portion, at which an extended line of the line connecting the continuous portion to the central portion intersects the curved surface portion, to the second intersecting portion at which the pair of inclined plane portions intersect the parallel plane portions.

An imaging apparatus according to claim 8 of the present application is characterized in that the second reflecting surface includes: an elliptically cylindrical surface obtained by making the central portion of a light source be the center of a curvature radius; a pair of parallel plane portions which are provided in part of the cylindrical surface portion and which are developed in approximately parallel with a central surface that makes the pair of first reflecting surfaces symmetrical; and a pair of inclined plane portions that are provided in part of the cylindrical surface portion and are extended and developed in the tangent line direction from a first intersecting portion, at which an extended line of the line connecting the continuous portion to the central portion intersects the cylindrical surface portion, to a second intersecting portion at which the pair of inclined plane portions intersect the parallel plane portions.

An imaging apparatus according to claim 9 of the present application is characterized in that the second reflecting surface includes: a first curved surface portion obtained by making the central portion of a light source be the center of a curvature radius; a second curved surface portion that passes the continuous portion and is obtained by making the center of the curvature radius urged from the central portion of the light source to the side approaching the continuous portion or to the side departing therefrom; and a pair of inclined plane portions which continue on both sides of the first curved surface portion and which are extended and developed in the tangent direction from the first intersecting portion, at which an extended line of the line connecting the continuous portion to the central portion intersects the first curved surface portion, to the second curved surface portion that intersects a vertical surface passing the central portion and vertically intersecting the central plane.

An imaging apparatus according to claim 10 of the present application is characterized in that the central portion of the curvature radius of the second curved surface is an intersection point vertically descended to a central surface from a first intersecting portion, at which an extended line of the line connecting continuous portions to the central portion intersects a first curved surface, or an intersection point in the vicinity thereof.

An imaging apparatus according to claim 11 of the present application is characterized in that the lower surface of a flashlight device is provided with a blindfolding board to cover a storage position when the flashlight device is moved to a pop-up position.

An imaging apparatus according to claim 12 of the present application is characterized in that the blindfolding board has a pair of shafts that project in directions opposite to each other on the same axis line and the pair of shafts are supported by both ends at the lower part of the flashlight device, and the board is capable of turning within the range of a predetermined angle with its own weight.

An imaging apparatus according to claim 13 of the present application is characterized in that a plunger mechanism is disposed in the lower direction of the blindfolding board for popping up a flashlight device.

According to an imaging apparatus of claim 1 of the present application, since the pop-up angle is made as small as 20 degrees or less, mechanical strengths of components in the pop-up position can be kept as small as possible and reductions in the number of the components as well as structural simplification can be obtained without making the thickness of sheet metal thick. Additionally, since the light emitting portion of the flashlight device is so disposed to be in a correct position as to face the front of the subject, no vignetting occurs and light can be efficiently irradiated on the subject.

According to an imaging apparatus of claim 2 of the present application, since the holding means is set farther ahead than in a conventional imaging apparatus, the whole size of the apparatus can be minimized and made thinner by making the pop-up angle small.

According to an imaging apparatus of claim 3 of the present application, since the continuous portions between the pairs of first reflecting surfaces and second reflecting surface is set closer to the opening side of the pair of first reflecting surfaces than the central portion of the light source stored in the second reflecting surface, all or most of reflecting light can be irradiated farther ahead of the opening portion by a predetermined light distribution angle and the imaging apparatus can be miniaturized and be made smaller while maintaining a predetermined optical performance.

According to an imaging apparatus of claim 4 of the patent application, since the second reflecting surface is formed of the cylindrical surface portion, the pair of parallel plane portions and inclined plane portions, light emitted from the light source can be reflected once, twice or more times by making use of the second reflecting surface, with the result that the light can be efficiently irradiated further ahead from the opening portion.

According to an imaging apparatus of claim 5 of the present application, since the length between the pair of continuous portions connecting the pair of the first reflecting surfaces to the second reflecting surface is made smaller than the diameter of the second reflecting surface, the amount of light reflected from the second reflecting surface and heading for the pair of first reflecting surface side can increase, as well as the amount of light irradiated forward from the opening side.

According to an imaging apparatus of claim 6 of the present application, since the second reflecting surface is made elliptical in shape, the forward and backward movements along the central surface of the position of the light source are made adjustable, so the light distribution angle of the light irradiated from the light source can be adjusted easily and accurately.

According to an imaging apparatus of claim 7 of the present application, since the second reflecting surface is formed of the curved surface, the pair of parallel plane portions and the pair of inclined plane portions, the light emitted from the light source can be reflected once, twice or more by making use of the second reflecting surface, with the result that the light can be efficiently irradiated ahead from the opening portion.

According to an imaging apparatus of claim 8 of the present application, since the second reflecting surface is formed of the cylindrical surface, the pair of parallel plane portions, and the pair of inclined plane portions, the light emitted from the light source can be reflected once, twice or more by making use of the second reflecting surface, with the result that the light can be efficiently irradiated ahead from the opening portion.

According to an imaging apparatus of claim 9 of the present application, since the second reflecting surface is formed of the first curved surface portion, second curved surface portion, and a pair of inclined portions, the light emitted from the light source can be reflected once, twice or more times by making use of the second reflecting surface, with the result that the light can be efficiently irradiated ahead from the opening portion.

According to an imaging apparatus of claim 10 of the patent application, since the central portion of the curvature radius of the second reflecting surface is made the intersection point vertically descended to the central surface from the first intersecting portion, or the point in the vicinity thereof, the light emitted from the light source can be efficiently reflected from the second reflecting surface toward the first reflecting surface side, with the result that the light can be efficiently irradiated ahead from the opening portion.

According to an imaging apparatus of claim 11 of the present application, since the storage position is covered with the blindfolding board when the flashlight device is moved to the pop-up position, it is possible to make it difficult to see things housed inside the exterior case, with the result that the appearance of the imaging apparatus can be improved.

According to an imaging apparatus of claim 12 of the present application, the blindfolding board can be made to have a simpler structure and can be loaded easily to the lower part of the flashlight device.

According to an imaging apparatus of claim 13 of the present application, since the plunger mechanism can be disposed by making use of the space portion formed under the flashlight device, the efficient use of the space portion becomes possible, which contributes to miniaturizing and making thinner the size of the imaging apparatus through miniaturizing the flashlight device.

BEST MODE FOR CARRYING OUT THE INVENTION

In the present invention, a pop-up angle is made smaller, the shape and structure of a reflector are devised to miniaturize a flashlight device and to reduce the number of components, and so an imaging apparatus that makes it possible to miniaturize and make thinner the imaging apparatus can be obtained with a simple constitution.

EMBODIMENT 1

Hereinafter embodiments of the present invention will be explained by referring to attached drawings. FIGS. 1 through 15 show embodiments of the present invention.

Figure 1:
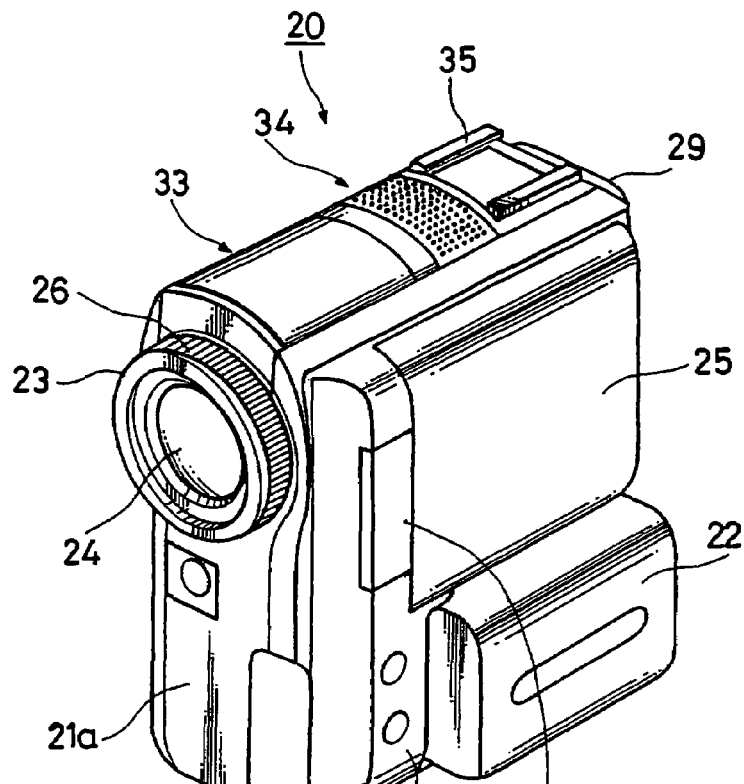
FIG. 1 shows an embodiment of an imaging apparatus of the present invention and is a perspective view of a state in which a flashlight device of a camcorder is stored in a storage position.
Figure 2:
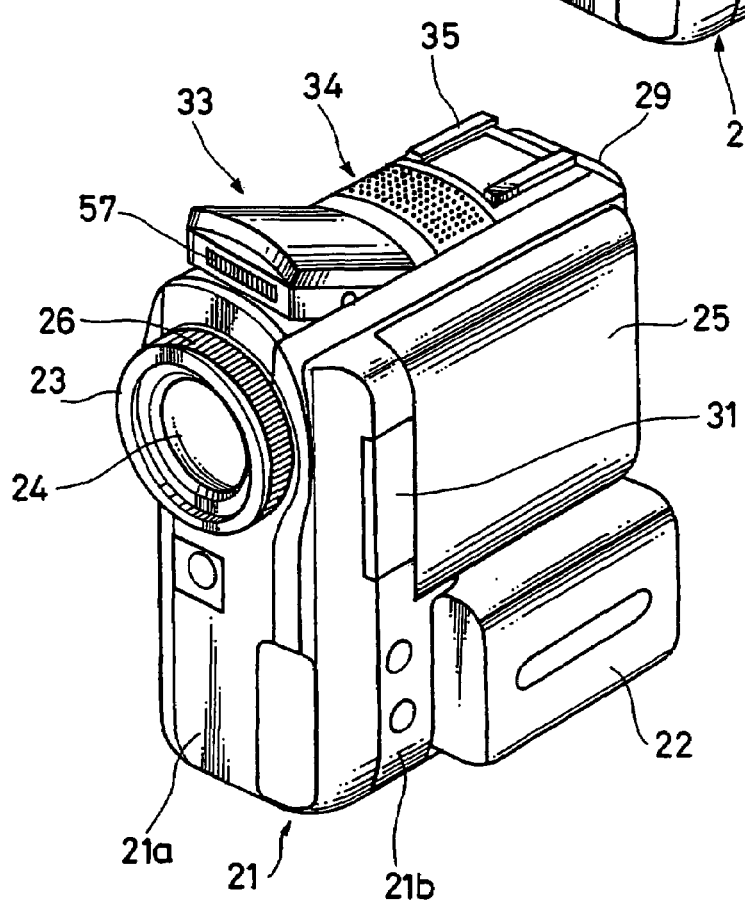
FIG. 2 is a perspective view of the camcorder shown in FIG. 1 in which the flashlight device is made to spring up to a pop-up position.
Figure 3:
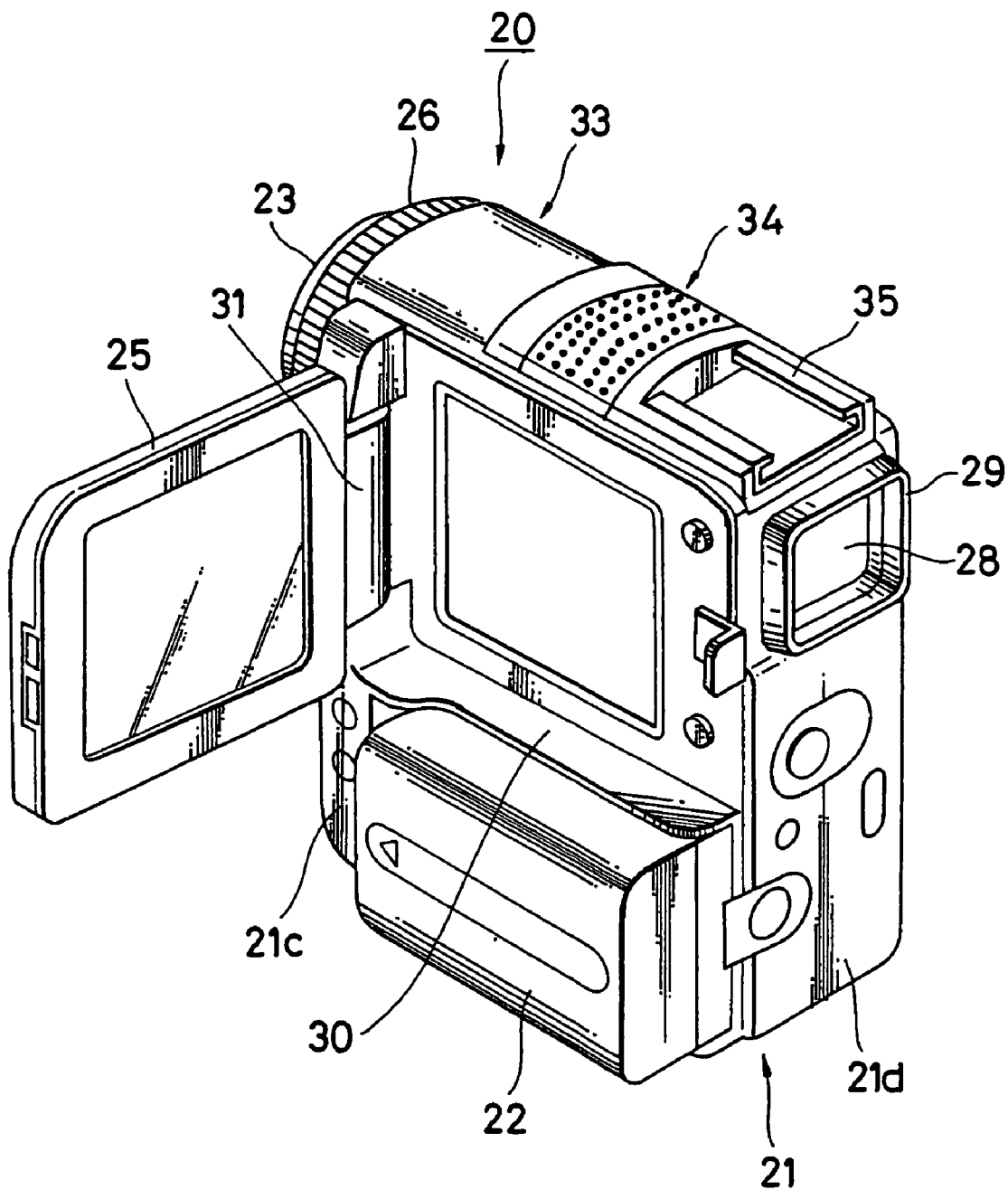
FIG. 3 is a perspective view seen from behind of the camcorder shown in FIG. 1 in which a liquid crystal display is in an open state.

As shown in FIGS. 1, 2 and 3, an embodiment of the imaging apparatus of the present invention is applied to a camcorder. This camcorder 20 includes a hollow exterior case 21 made of an approximately square housing, a battery power source 22 detachably loaded to one side of the exterior case 21, a lens device (optical lens) 23 having an objective lens 24 disposed on the front of the exterior case 21, a liquid crystal display 25 that also functions as a finder and touch operation panel and the like.

The exterior case 21 includes a front portion 21a with the objective lens 24 and a focus ring 26 exposed, a right-side surface portion 21b to form a side surface on the right side seen from the front, a left-side surface portion 21c to form a side surface on the left side, a rear surface portion 21d to form a rear surface and a bottom surface portion (not shown). The lens device 23 is provided on the upper part of the exterior case 21 and a finder 28 is provided behind the lens device 23. The finder 28 is exposed from the rear surface portion 21d with an eye-cup 29 attached to surround the periphery thereof.

A power source storage portion is provided on the lower part of the right-side surface portion 21b of the exterior case 21 and the battery power source 22 is detachably loaded to the power source storage portion. A concave portion 30 is provided on the upper part of the right-side surface portion 21b to store the liquid crystal display 25. The side part of the liquid crystal display 25 on the front side is supported to be capable of turning by a hinge means 31 provided on the right-side surface portion 21b. As the result, the liquid crystal display 25 is capable of being in a closed state shown in FIG. 1 and in an open state shown in FIG. 3.

A space portion is provided on the upper part of the exterior case 21 to be held between the upper side of the right-side surface portion 21b and that of the left-side surface portion 21c. In the space portion, there are provided in turn a flashlight device 33, a microphone device 34 and an accessory shoe 35 from the side closer to a focus ring 26. One end of the accessory shoe 35 is opened to the rear surface portion 21d side, and accessories such as an external stroboscope device and the like are detachably loaded to the opening.

Figure 11:
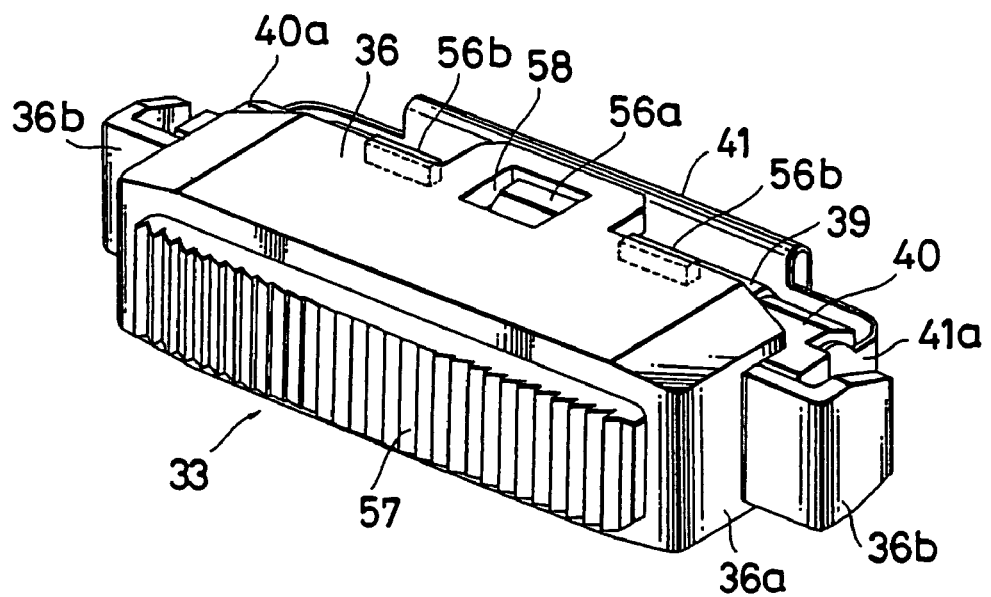
FIG. 11 is a perspective view of the flashlight device according to the imaging apparatus of the present invention.
Figure 12:
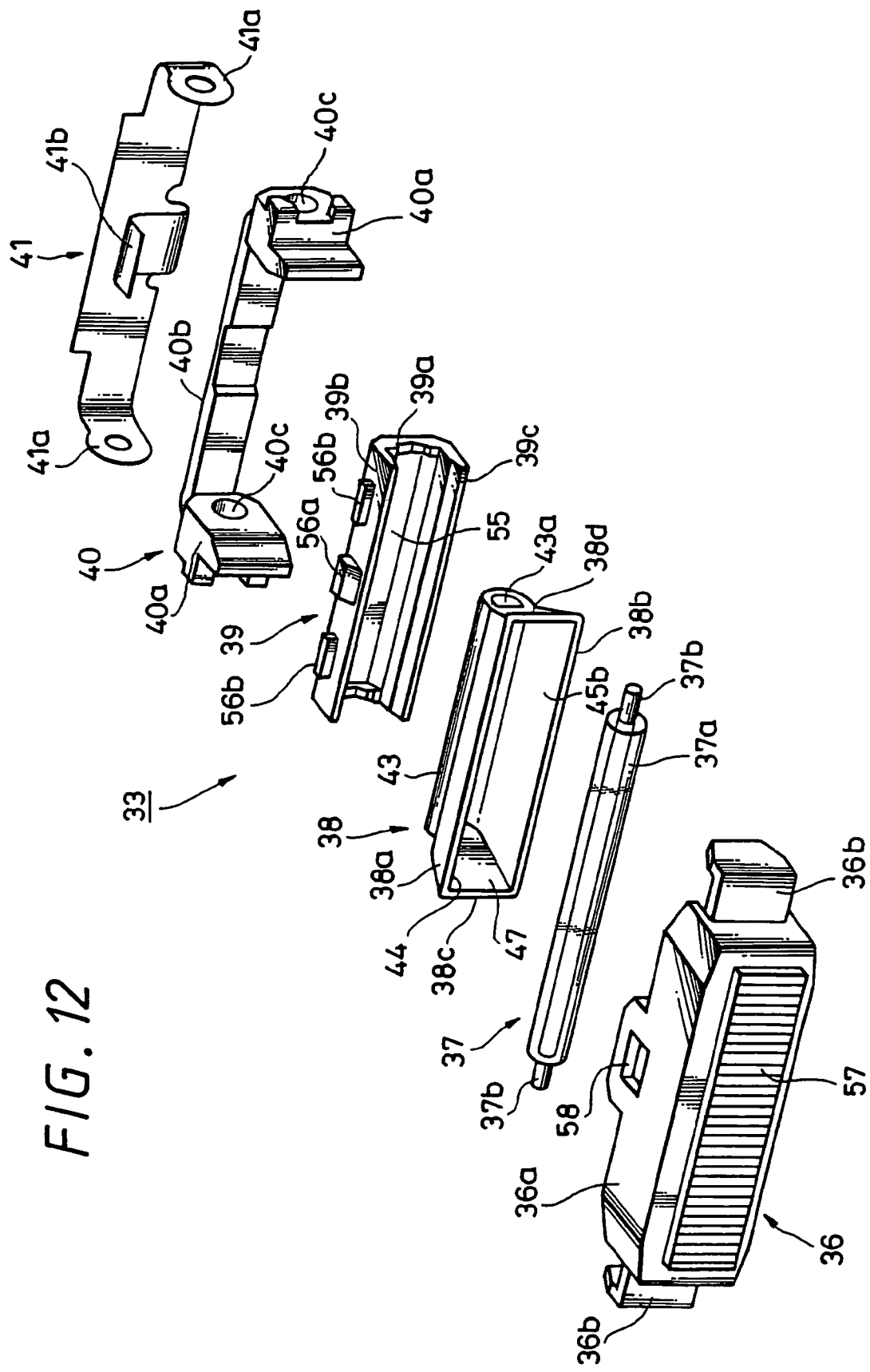
FIG. 12 is an exploded perspective view of the flashlight device according to the imaging apparatus of the present invention.

The flashlight device 33, usually stored in the exterior case 21, emits light continuously or intermittently in conjunction with imaging operations of the camcorder 20 to illuminate a subject and has a light emitting portion popped up to be mainly exposed when in use. As shown in FIGS. 11 and 12, the flashlight device 33 includes a protector 36, a xenon tube 37 as a light source, a reflecting mirror (reflector) 38, a holder 39, a sealed rubber 40 and a flexible print circuit board (hereinafter referred to flexi-board) 41.

As shown in FIG. 12, the reflecting mirror 38 includes a pair of roughly cylinder-like upper surface portion 38a and lower surface portion 38b opposed to each other up and down, a pair of side surface portions 38c, 38d opposed to each other right and left, and a light source storage portion 43 made to be continuous to the back surface side thereof. The upper and lower surface portions 38a, 38b and the left and right sides surface portions 38c, 38d have their rear surface sides narrowed to form a cross-sectional shape of something like a trumpet with an opening 44 side widened, and a light source storage portion 43 is integrally provided to close the rear surface side.

Figure 13:
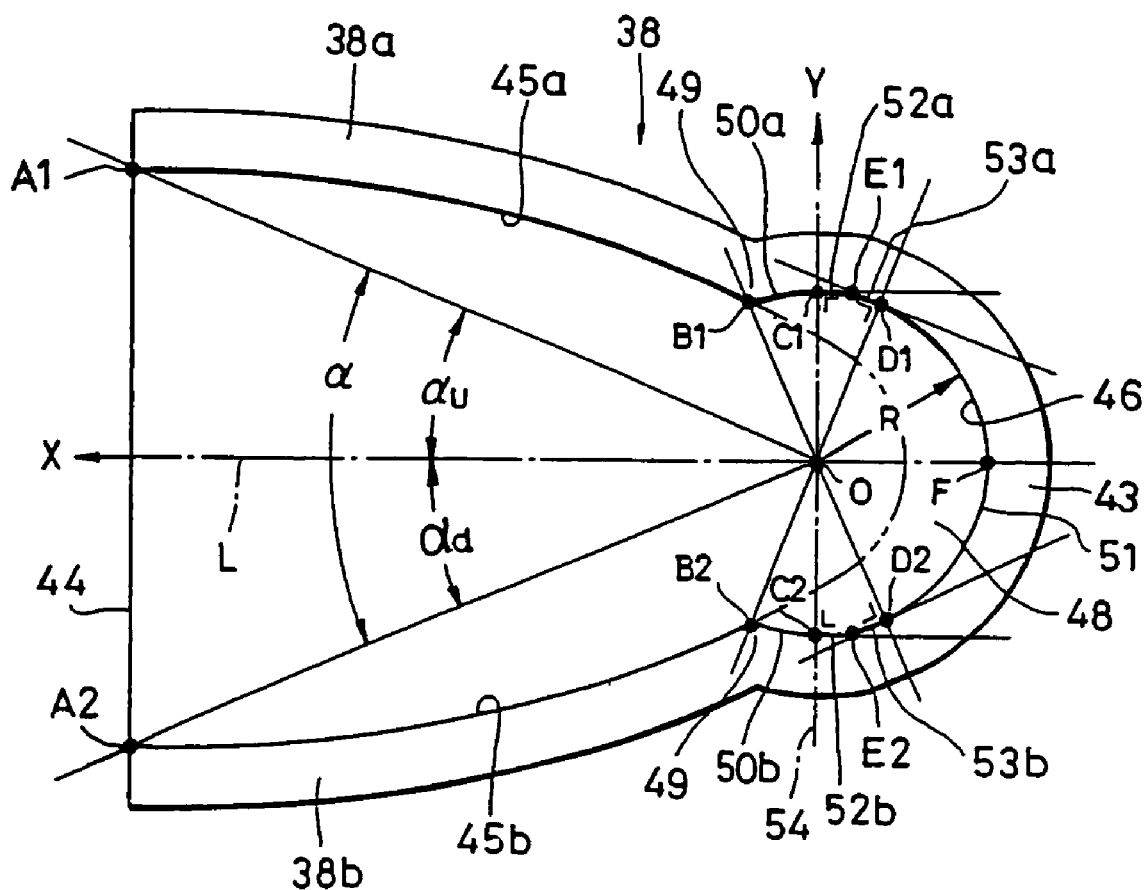
FIG. 13 is a cross-sectional view of a reflecting mirror of the flashlight device according to the imaging apparatus of the present invention.

As shown in FIG. 13, the upper and lower surface portions 38a, 38b and light source storage portion 43 are made symmetrical in shape in the upper and lower direction with a central plane L as a reference. The respective inner surfaces of the upper and lower surface portions 38a, 38b constitute a pair of first reflecting surfaces 45a, 45b opposed to each other in the upper and lower direction and the inner surface of the light source storage portion 43 constitutes a second reflecting surface 46. These first reflecting surfaces 45a, 45b, the second reflecting surface 46 and third reflecting surfaces 47 that are inner surfaces of the right and left side surfaces portions 38c, 38d are formed to be mirror-finished or the like so as to reflect the light well.

Further, the first reflecting surfaces 45a, 45b are each formed of part of an approximately cylinder-like cylindrical curved surface as a whole. As a cross-sectional shape of the curved surfaces of the first reflecting surfaces 45a, 45b, a circular shape, elliptical shape, parabolic line, second-order curved line and other curved lines can be applied. Furthermore, the right and left side surfaces portions 38c, 38d may be curved surfaces with an appropriate curvature radius or planes inclined at an appropriate angle.

Holes 43a that have the similar shape to the second reflecting surface 46 are open on the both sides of the light source storage portion 43. With the xenon tube 37 inserted into and pulled out from the holes 43a, the xenon tube 37 is detachably loaded to a central hole 48 which is provided in the central portion of the light source storage portion 43 and the inner surface of which constitutes the second reflecting surface. The inner diameter of the central hole 48 is set to approximately the same as the outer diameter of the xenon tube 37 so that the xenon tube 37 may engage with the central hole without any play. As the result, the xenon tube 37 that is the light source is constituted such that the circumference thereof is surrounded by the second reflecting surface 46 exceeding an angle of 180 degrees. Further, in parts at which the first reflecting surfaces 45a, 45b and the second reflecting surface 46 intersect, there are each formed constriction portions 49, 49 that set joint gaps shorter than the length two times as long as the curvature radius that forms the second reflecting surface.

The second reflecting surface 46 that is the inner surface of the central hole 48 of the light source storage portion 43 is, unlike the first reflecting surfaces 45a, 45b, formed into a non-circular shape such that a plane part is provided in part of a cylinder-like cylindrical surface obtained by making a center O be the center of the curvature radius. Accordingly, the xenon tube 37 can be correctly positioned by simply inserting the xenon tube 37 into the light source storage portion 43, with the result that the xenon tube 37 can be disposed at a predetermined position on the reflective surface with ease and accuracy.

Namely, the second reflecting surface 46 includes: a pair of upper and lower front side cylindrical surfaces 50a, 50b each made of a cylinder-like cylindrical surface portion with the arc thereof obtained by making the center O of the central hole 48 be a central point and a half the diameter of the xenon tube 37 be a curvature radius R, being continuous in the shaft direction and a rear side cylindrical surface 51; a pair of upper and lower parallel planes 52a, 52b that are made to be continuous with the rear part of the upper and lower front side cylindrical surfaces 50a, 50b and extended in parallel with a central plane L; and a pair of inclined planes 53a, 53b continuous with the front part of the rear side cylindrical surface 51, inclined at a predetermined angle with respect to the central plane L, and the front end parts thereof being made to be continuous with the pair of parallel planes 52a, 52b.

The pair of parallel planes 52a, 52b are planes, extending in the tangent line direction, with points C1, C2, at which a reference plane (plane on a Y axis intersecting an X axis) 54 that passes the center O of the central hole 48 and is developed in the direction perpendicularly intersecting the central plane L and the cylindrical surface portion 46 intersect each other, each being as one end and with points E1, E2, intersecting the pair of inclined planes 53a, 53b as the other end. It is most desirable that these points C1, C2 are points on the reference plane 54, but are not necessarily limited to the case.

That is, it does not mean in a narrow sense that the parallel planes 52a, 52b are in parallel with the central plane L. For example, the points C1, C2 may be set at positions displaced from the reference plane 54 to the opening portion 44 side, in which case a parallel plane side becomes wider on the rear surface side than on the opening portion 44 side. Contrary to this, the points C1, C2 may be set at positions displaced from the reference plane L to the rear surface side, in which case a parallel plane becomes wider on the opening portion 44 side than on the rear surface side.

The pair of inclined planes 53a, 53b are planes that are extending in the tangent direction, with points D1, D2 at which an extended line of the line connecting points B1, B2, where the pair of first reflecting surfaces 45a, 45b and the pair of front side cylindrical surfaces 50a, 50b intersect each other, to the center O of the central hole 48 and the rear side cylindrical surface 51 intersect each other, each being as one end and with points E1, E2, at which the planes and the pair of inclined planes 53a, 53b each intersect each other, each being as the other end. Similarly to the points C1, C2, the positions of points E1, E2 are not limited to those shown in FIG. 13, and corresponding to the position of points C1, C2, the positions may be appropriately displaced in an anteroposterior direction.

As materials for the reflecting mirror 38 having such a constitution, for example, "MIRO (trade name)" manufactured by Alanod of Germany can be applied to. This "MIRO (trade name)" is the one in which a vacuum deposition of high-purity aluminum is applied on the surface of an aluminum base material and a process is further performed to increase reflection by depositing a transparent oxide film thereon. However, the materials of the reflecting mirror are not limited to the case. Various kinds of materials may be used if only they have high reflectance against light.

The xenon tube 37 as the light source includes a cylinder-like lamp 37a with high-pressure xenon gas sealed therein and electrode terminals 37b, 37b projected from the both ends of the lamp 37a. When the xenon tube 37 is inserted in the central hole 48 of the reflecting mirror 38, the electrode terminals 37b, 37b at both ends and the both end parts of the lamp 37a are projected from the both side parts of the light source storage portion 43.

The reflecting mirror 38 to which the xenon tube is loaded is loaded to a holder 39 disposed at the rear surface thereof. The holder 39 is formed of a trough-like member having a U-shaped cross-section and the light source storage portion 43 of the reflecting mirror 38 is inserted in a concave portion 55 to be engaged, where is surrounded by a rear surface portion 39a and an upper surface portion 39b, lower surface portion 39c that are continuous with the both ends of 39a. The upper surface portion 39b and lower surface portion 39c each are provided with an engaging nail 56a to catch and hold the protector 36 and a plurality of positioning projection portions 56b to position the protector 36 to a predetermined depth.

Materials for the holder 39, for example, may suitably use ABS resin (acrylonitrile, butadiene, styrene resin), but are not limited to them. Not only other plastics but metals or the like other than plastic may be used.

The holder 39 and reflecting mirror 38 are fastened with a sealed rubber 40 and are integrally fixed together. The sealed rubber 40 includes a pair of supporting portions 40a, 40a and a coupling portion 40b for coupling the both-ends supporting portions 40a, 40a and is integrally formed of elastic materials. The pair of supporting portions 40a, 40a are provided with support holes 40c into which the both ends of the xenon tube is inserted. As materials for the sealed rubber 40, silicon rubber may be most preferable, but other rubber-like elastic members can be used, as a matter of course.

On the rear surface of the sealed rubber 40, there is provided a flexi-board 41 connecting to a power source that supplies electricity to the xenon tube 37. The flexi-board 41 has electrode terminal portions 41a, 41a connected to electrode terminals 37b, 37b that project on both sides in the axial direction of the xenon tube 37 and an earth terminal portion 41b connected to the reflecting mirror 38. These terminal portions 41a, 41a and 41b are connected to the electrode terminals 37b, 37b and reflecting mirror 38 so that electrical connections are carried out.

A protector 36 formed of a transparent material is detachably loaded to the front part of the reflecting mirror 38. The protector 36 includes a main body portion 36a open to one surface for covering the front side from the mid-part of the light source storage portion 43 of the reflecting mirror 38 and cover portions 36b, 36b for covering the outside of the electrode terminals 37b, 37b of the xenon tube 37 stored in the light source storage portion 43, with the front thereof provided with a Fresnel lens portion 57. Further, an engaging hole 58 is provided on the upper and lower surfaces of the main body portion 36a that are respectively engaged with the upper and lower engaging nails 56a of the holder 39.

The flashlight device having such a constitution can easily be assembled in the following way, for example. First, the xenon tube 37 that is the light source is loaded to the light source storage portion 43. That is, the xenon tube 37 is inserted in the holes 43a of the light source storage portion 43 from the side and the electrode terminals 37b, 37b are respectively projected from the both ends thereof.

Next, the light source storage portion 43 of the reflecting mirror 38 is fit in the concave portion 55 of the holder 39 and the reflecting mirror 38 is supported with the holder 39. Then, the electrode terminals 37b, 37b are respectively inserted in the supporting holes 40c, 40c at both ends of the sealed rubber 40 so that the supporting portions 40a respectively cover side surfaces of the light source storage portion 43 and holder 39. On this occasion, the earth terminal portion 41b is electrically connected in advance to the holder 39.

Next, after the sealed rubber 40 is loaded, the electrode terminal portions 41a, 41a at the both ends of the flexi-board 41 are overlapped to the outsides of the electrode terminals 37b, 37b of the xenon tube 37. Then, the electrode terminal 37b and electrode terminal portion 41a are electrically connected by soldering. Thereafter, the protector 36 is attached to the front part of the reflecting mirror 38. As the result, the assembly work is finished and the flashlight device is obtained, as shown in FIG. 11.

The function of the flashlight device 33 assembled as described above will be explained with reference to, for example, FIGS. 14A, 14B, 14C and FIGS. 15A, 15B, 15C. According to illustrated embodiments, a maximum light distribution angle α is set at 45 degrees (an upper light distribution angle αu is 22.5 degrees and a lower light distribution angle αd is also set at 22.5 degrees) and the center O of the xenon tube 37 is made the focal point of the rear side cylindrical surface 51.

Figure 14A:
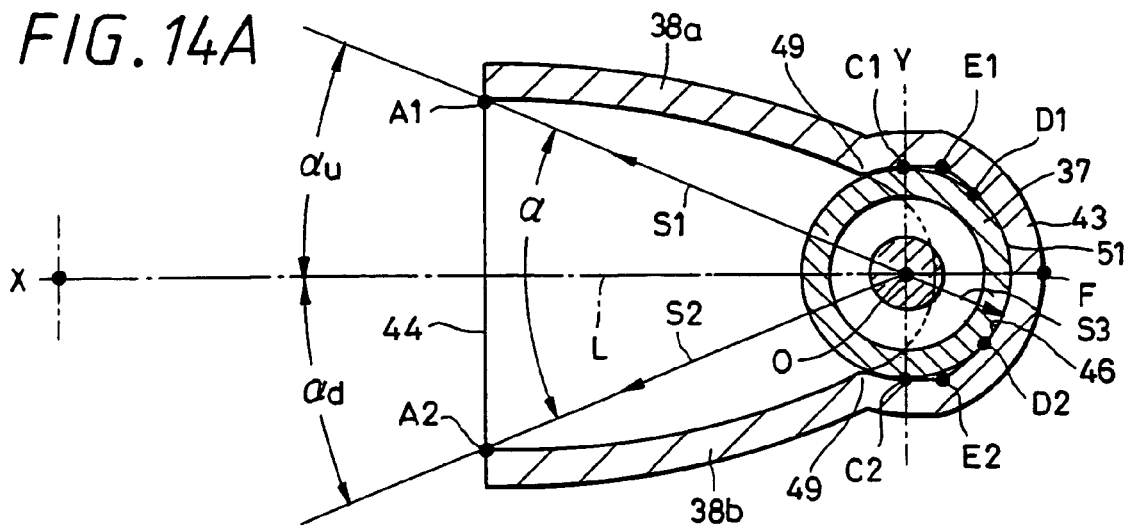
FIG. 14A is a view for explaining an optical path of the reflecting mirror shown in FIG. 13 and is an explanatory view in which light is irradiated directly ahead.

FIG. 14A shows light out of the light emitted from the center O of the xenon tube 37 directly heading for the opening portion 44 and the light path of light S1 within the range of the upper light distribution angle αu and the light path of light S2 within the range of the lower light distribution angle αd. In this case, the light S1 and S2 travel linearly and are emitted in the forward direction in the range of a point A1 and a point A2 at the front edges of the opening portion side 44 of the pair of first reflecting surfaces 45a, 45a, that is, within the maximum light distribution angle α(α=αu+αd).

Then, of the light emitted from the center O of the xenon tube 37, light S3 heading for the rear surface side within an angle range of the maximum light distribution angle α is irradiated between a point D1 and point D2 of a rear side cylindrical surface 51. Since the part between these points D1 to D2 is an arc obtained from the curvature radius R (radius of the xenon tube 37) with the center O that is the focal point of the rear side cylindrical surface 51 as the central point, light S3 incident on the rear side cylindrical surface 51 returns directly over the light path it has just passed and becomes reflecting light heading for the opening portion 44 side.

Figure 14B:
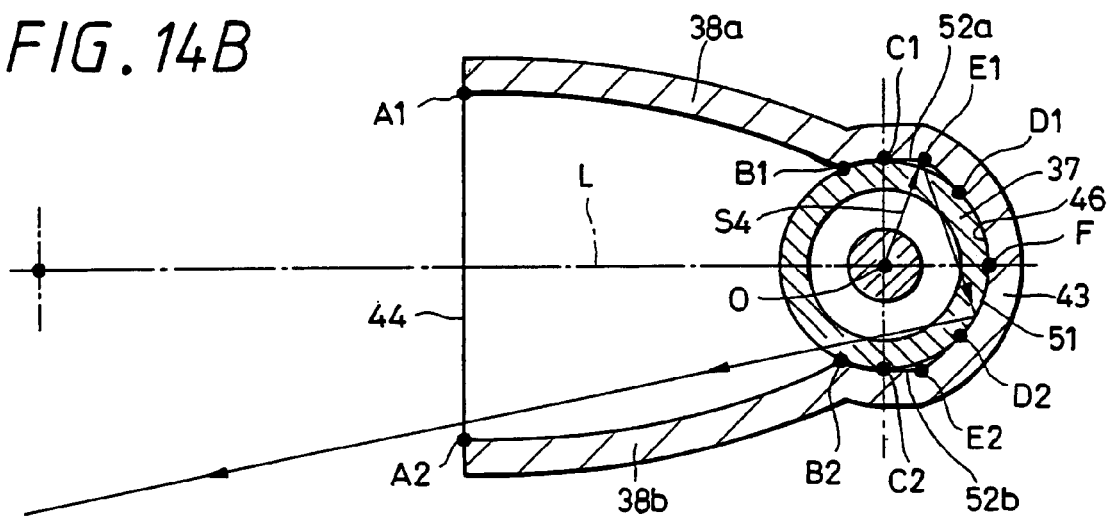
FIG. 14B is a view for explaining an optical path of the reflecting mirror shown in FIG. 13 and is an explanatory view in which light is first-order reflected from the parallel plane.

FIG. 14B shows the light path of light S4, out of the light emitted from the center O of the xenon tube 37, heading for the second reflecting surface 46 side, which is irradiated on the upper parallel plane 52a between a point C1 and point E1 (similarly to light irradiated on the lower parallel plane 52b between a point C2 and point E2, because the upper light and lower light become symmetrical in shape).

Since the S4 emitted from the center O of the xenon tube 37 is made inclined to be incident on the rear surface side of the upper parallel plane 52a, the reflecting light thereof is made further inclined toward the rear surface side to be incident on the rear side cylindrical surface 51. The light made incident on the rear side cylindrical surface 51 changes its direction and is reflected toward the opening portion 44 side in accordance with the incident angle and travels to the opening portion 44 side within the range of the lower light distribution angle αd and is emitted in the forward direction from the opening portion 44.

Figure 14C:
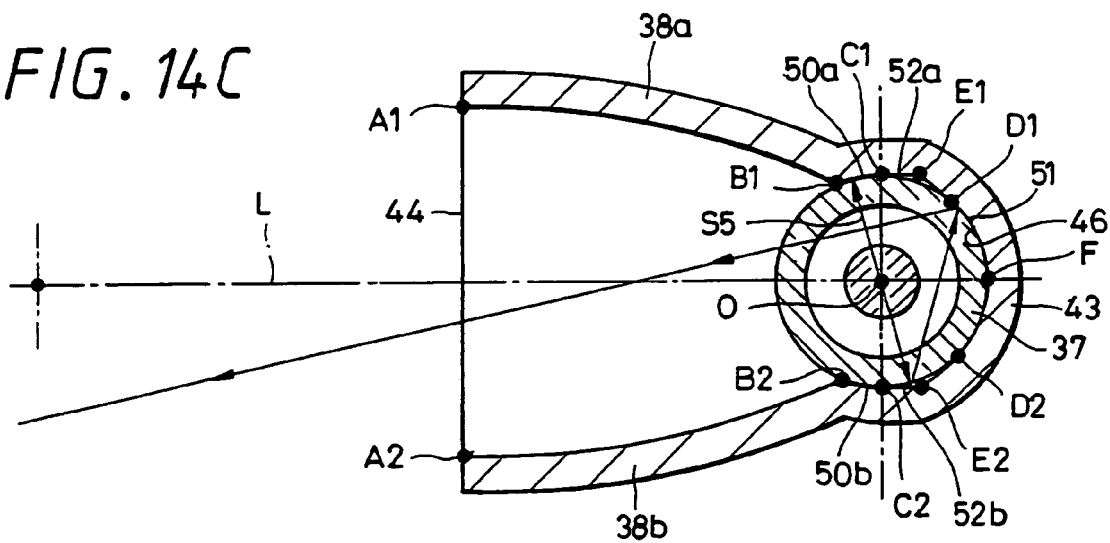
FIG. 14C is a diagram for explaining the optical path of the reflecting mirror shown in FIG. 13 and is an explanatory view in which light is first-order reflected from a front-side cylindrical surface.

FIG. 14C shows the light path of light S5, out of the light emitted from the center O of the xenon tube 37, heading for the second reflecting surface 46 side, which is irradiated on the upper parallel plane 50a between a point B1 and point C1 (similarly to light irradiated on the lower parallel plane 50b between a point B2 and point C2, because the upper light and lower light become symmetrical in shape).

Since the light S5 emitted from the center O of the xenon tube 37 is irradiated vertically on the upper front side cylindrical surface 50, the reflecting light thereof returns directly over the light path it has just passed and heads for the opposite side and is made incident on the lower parallel plane 52b. The light that is made incident on the lower parallel plane 52b is further reflected toward the rear surface side and made incident on the rear side cylindrical surface 51. The light made incident on the rear side cylindrical surface 51 changes its direction and is reflected toward the opening portion 44 side in accordance with an incident angle and travels to the opening portion 44 side within the range of the lower light distribution angle αd and is emitted in the forward direction from the opening portion 44.

Figure 15A:
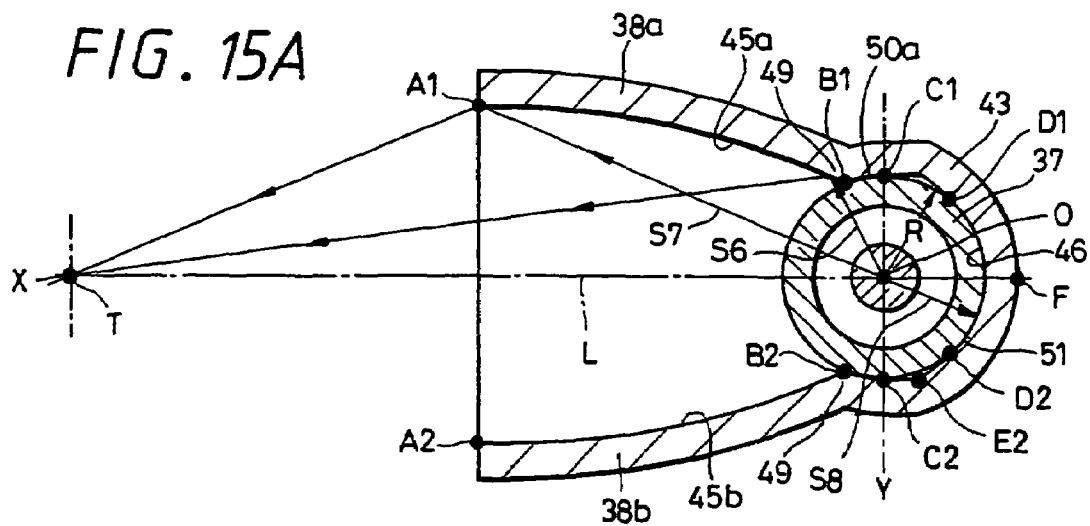
FIG. 15A is a view for explaining the optical path shown in FIG. 13 and is an explanatory view in which light is reflected from the first reflecting mirror.

FIG. 15A shows the light paths of light S6 and S7, out of the light emitted from the center O of the xenon tube 37, heading for the opening portion 44 side, which are irradiated on the first reflecting plane 45a between a point A1 and point B1 (similarly to light irradiated on the lower parallel plane 45b between a point A2 and point B2, because the upper light and lower light become symmetrical in shape).

The light S6 and S7 emitted from the center O of the xenon tube 37 are inclined and made incident toward the opening portion 44 side of the upper first reflecting surface 45a. At this time, since the focal point of the upper first reflecting surface 45a is T (similarly with respect to the lower first reflecting surface 45b), reflecting light that is reflected from the upper reflecting surface 45a travels heading for the focal point T in either case of light S6 and S7. As the result, as is the case of the direct light of FIG. 14A, light incident on an area within the points A1 to B1 of the upper first reflecting surface 45a all becomes reflecting light within the upper distribution angle αu and is emitted in a forward direction from the opening portion 44.

At this time, of light emitted from the center O of the xenon tube 37, light S8 heading for the rear surface side within the range of the points A1 and B1 (similarly to the range from the point A2 to point B2) is irradiated between the point D1 and D2 of the rear side cylindrical surface 51. Therefore, S8 incident between the points D1 and D2 of the rear side cylindrical surface 51 directly returns the light path it has just passed and is reflected from the upper first reflecting surface 45a (the same in the case of the lower first reflecting surface 45b) and is emitted in the forward direction from the opening portion 44.

Figure 15B:
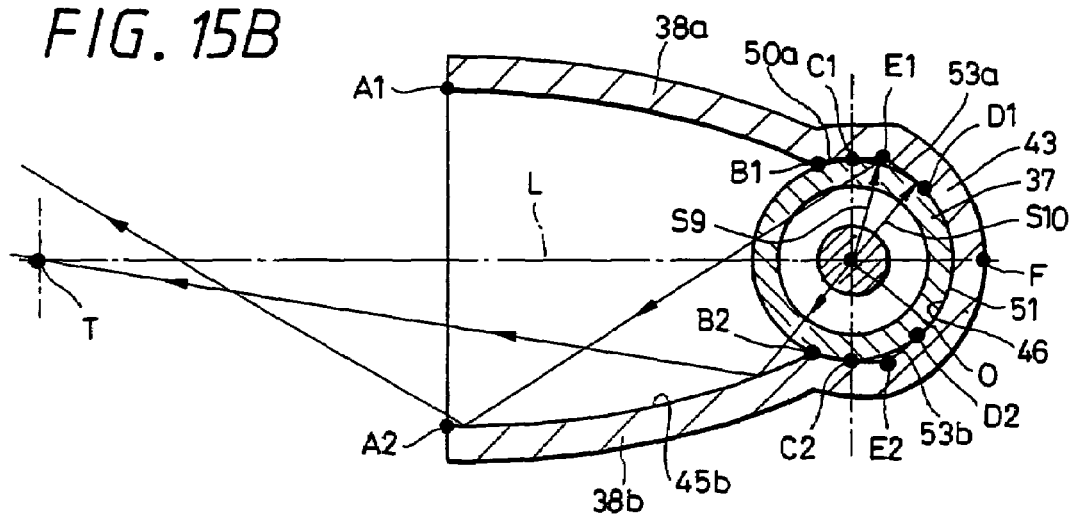
FIG. 15B is a view for explaining the optical path shown in FIG. 13 and is an explanatory view in which light is first-order reflected from an inclined plane.

FIG. 15B shows the light paths of light S9 and S10, out of the light emitted from the center O of the xenon tube 37, heading for the second reflecting surface 46 side, which is irradiated on the upper parallel plane 53a between a point E1 and point D1 (similarly to light irradiated on the lower parallel plane 53b between a point E2 and point D2, because the upper light and lower light become symmetrical in shape).

Since S9 emitted from the center O of the xenon tube 37 is inclined to be incident on the upper inclined plane 53a, the reflecting light changes the incident angle thereof and is irradiated toward the opening portion 44 side. Then the light S9 is reflected from the lower first reflecting surface 45b in the forward direction, changes its direction toward the upper direction and is emitted forward from the opening portion 44 in the range of light distribution angle α.

Further, since the light S10 emitted from the center O of the xenon tube 37 is made vertically incident on the upper inclined plane 53a, its reflecting light directly returns over the light pass it has just passed and heads for the opposite side. Then, its reflecting light is reflected from the lower first reflecting surface 45b in the forward direction, changes its direction upward. Further, the light S10 travels heading for the focal point T and is emitted ahead from the opening portion 44.

Figure 15C:
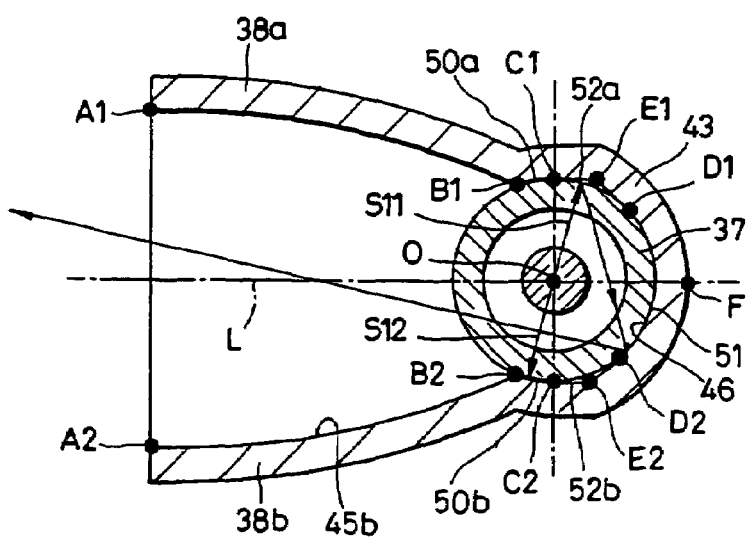
FIG. 15C is a view for explaining the optical path shown in FIG. 13 and is an explanatory view in which light is first-order reflected from the parallel plane.
Figure 16:
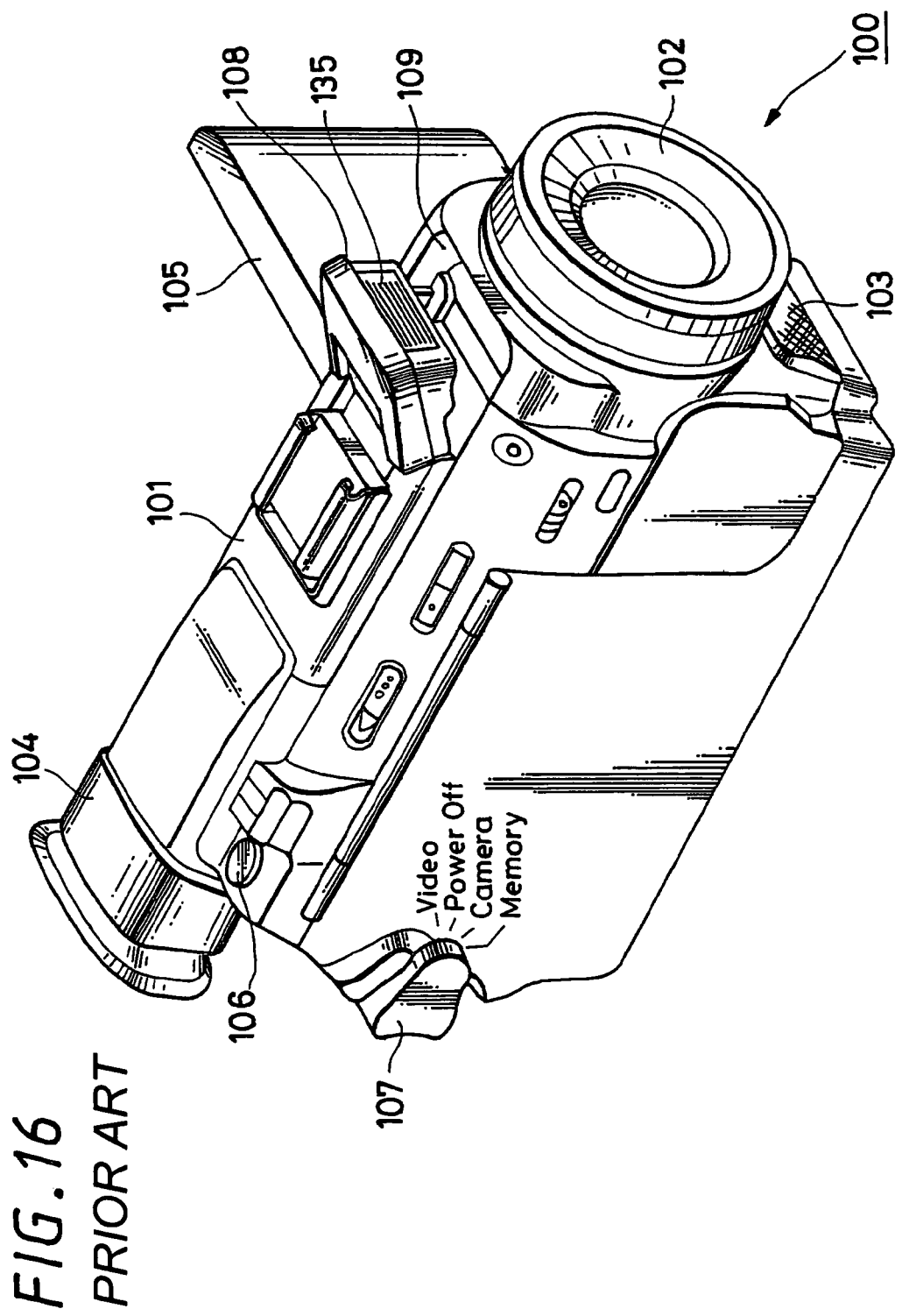
FIG. 16 is a perspective view showing an appearance of a conventional imaging apparatus in which a flashlight device is moved to a pop-up position.
Figure 17:
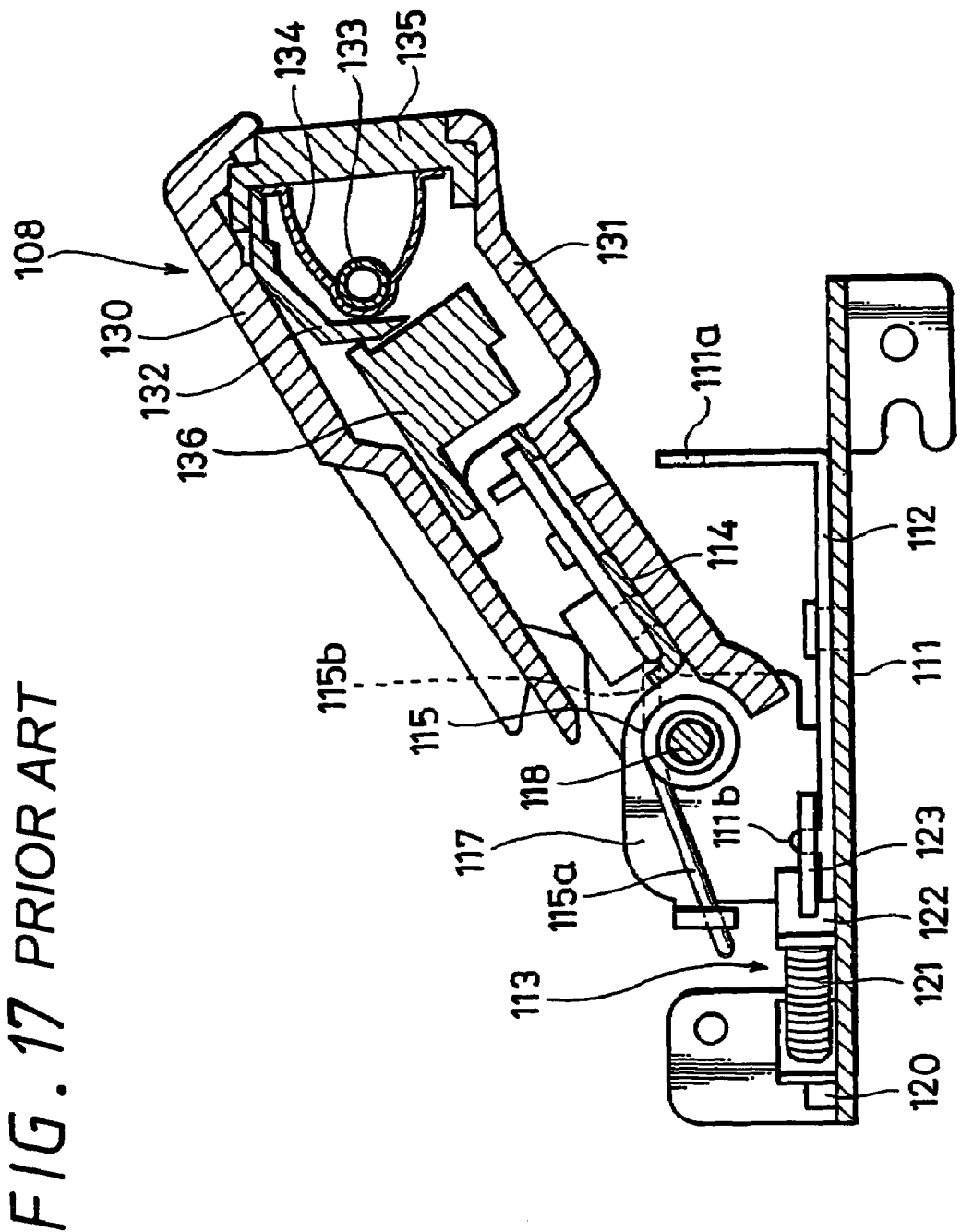
FIG. 17 is an explanatory view of showing the cross-section of the flashlight device and a pop-up mechanism in a conventional imaging apparatus.
Figure 18:
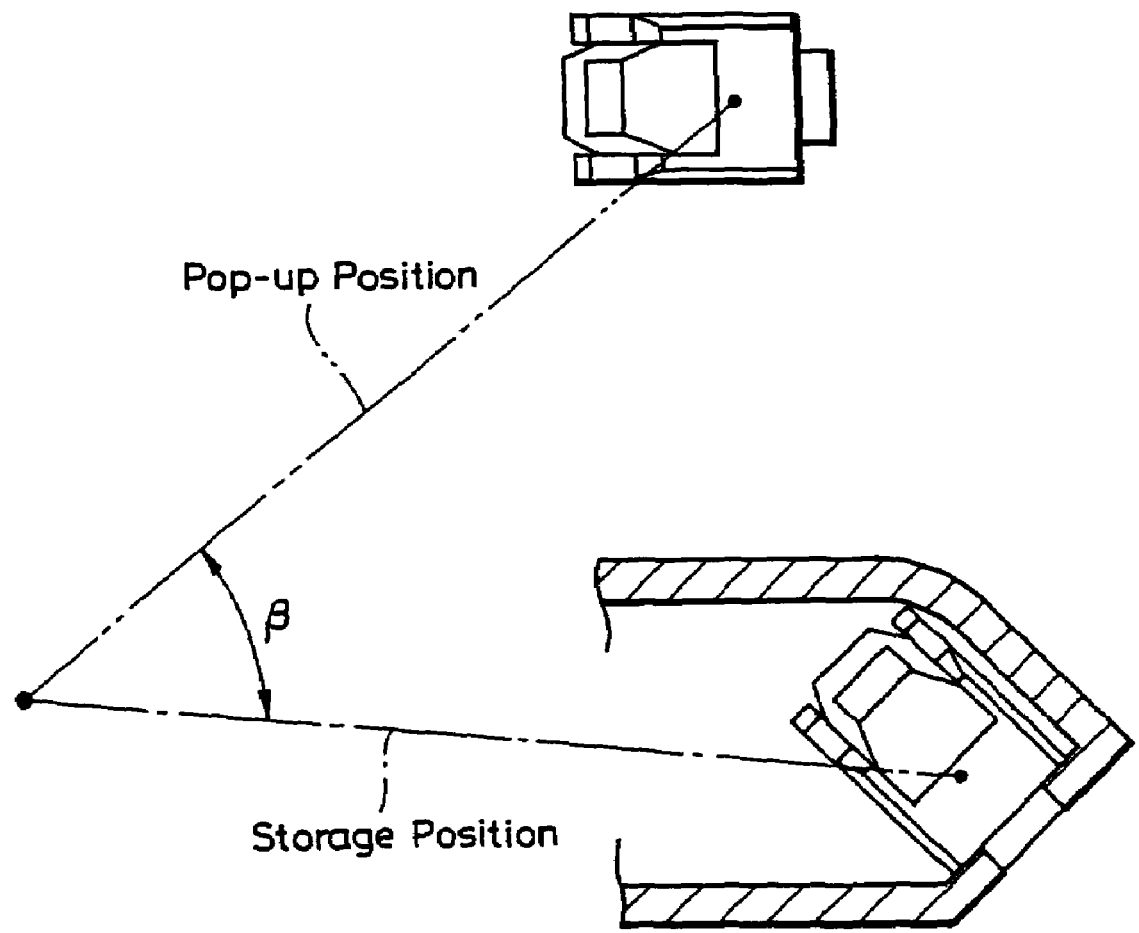
FIG. 18 is an explanatory view for explaining a pop-up angle in a conventional flashlight device.

FIG. 15C shows the light path of light S11, out of the light emitted from the center O of the xenon tube 37, heading for the second reflecting surface 46 side, which is irradiated on the upper parallel plane 52a between a point C1 and point E1 (similarly to light irradiated on the lower parallel plane 52b between a point C2 and point E2, because the upper light and lower light become symmetrical in shape) and shows the light path of light S12, out of the light emitted from the center O of the xenon tube 37, heading for the second reflecting surface 46 side, which is irradiated on the lower front side cylindrical surface 50a between a point B2 and point C2 (similarly to light irradiated on the upper front side cylindrical surface 50a between a point B1 and point C1, because the upper light and lower light become symmetrical in shape).

Since the light S11 emitted from the center O of the xenon tube 37 is inclined to be incident on the upper parallel plane 52a, the reflecting light changes its direction and is reflected toward the rear surface side in accordance with an incident angle. The reflecting light thereof is incident on the rear side cylindrical surface 51, changes its direction and is emitted toward the opening portion 44 side in accordance with an incident angle. Then, the light S11 travels toward the opening portion 44 side and is emitted ahead from the opening portion 44 within the range of the light distribution angle α.

Further, since the light S12 emitted from the center O of the xenon tube 37 is vertically incident on the lower front side cylindrical surface 50b, the reflecting light directly returns over the light path it has just passed and heads for the opposite side. Then, after being incident on the upper parallel plane surface 52a, the light S12 passes the same light path as that of the light S11 mentioned above, changes its direction in the forward direction and is emitted ahead from the opening portion 44.

According to the flashlight device 33 of this embodiment, there is no change in the light emitted directly ahead from the xenon tube 37 that is the light source, because it is directly emitted ahead or is reflected ahead after being reflected from the first reflecting surfaces 45a and 45b in the same way as conventionally, but as for the light emitted in the rear direction from the xenon tube 37, reflection efficiency is largely improved by the second reflecting surface 46.

Namely, when reflecting light from the second reflecting surface 46 is considered, the reflecting light is reflected in the range of 0 degree and ±22.5 degrees in the rear side cylindrical surface 51 ranging from the point D1 to point D2. In addition, light incident on the upper parallel plane 52a from the point C1 to point E1 and light incident on the lower parallel plane 52b from the point C2 to point E2 are first-order reflected from the rear side cylindrical surface 51 and directly reflected ahead or reflected ahead after being second-order reflected from the first reflecting surfaces 45a, 45b. Further, light incident on the upper inclined plane 53a from the point E1 to point D1 and light incident on the lower inclined plane 53b from the point E2 to point D2 are reflected from the planes toward the opening portion 44 side and reflected directly ahead or reflected ahead after being second-order reflected from first reflecting surfaces 45a, 45b.

Additionally, after light incident on the upper front side cylindrical surface 50a from the point B1 to point C1 and light incident on the lower front side cylindrical surface 50b from the point B2 to point C2 are first-order reflected from the upper and lower parallel planes 52a, 52b or the inclined planes 53a, 53b and then, are second-order reflected from the rear side cylindrical surface 51 or first reflecting surfaces 45a, 45b, and, depending on circumstances, the light repeats third-or-more-order reflections and is all emitted to the outside from a forward opening portion 44. Therefore, inside the reflecting mirror 38, heat transfer due to light absorption is restrained as much as possible to output the light outside so as to make much use of the light as effective light. As a result, according to the embodiment, all the light directly emitted and reflected light is emitted efficiently within a predetermined light distribution angle.

Figure 4:
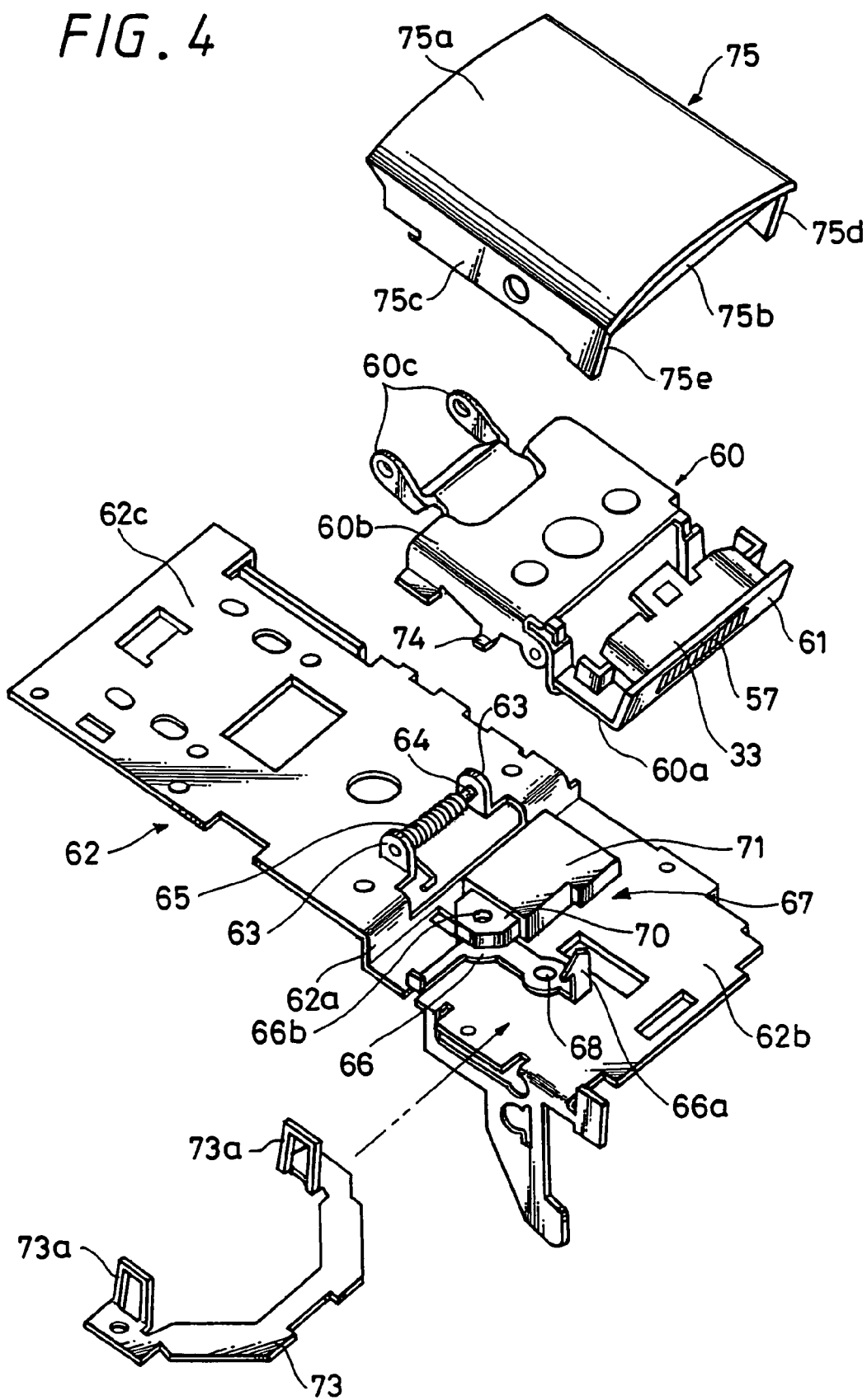
FIG. 4 is an exploded perspective view of the flashlight device of the camcorder shown in FIG. 1 for explaining the pop-up mechanism and the like thereof.

As shown in FIG. 4, the flashlight device 33 having the above-mentioned constitution is attached to the tip part of a stroboscope frame 60 that is a turning arm. The stroboscope frame 60 has a holding portion 60a to which the flashlight device 33 is loaded and a supporting portion 60b to be continuous with the rear part of the holding portion 60a. A front piece 61 with a hole which Fresnel lens portion 57 of the protector 36 of the flashlight device is fit in is provided at the tip of the holding portion 60a. Additionally, a concave portion in which a plunger mechanism mentioned later on is stored is provided to the lower surface of the holding portion 60a. Further, a pair of supporting pieces 60C, 60C for supporting the stroboscope frame 60 to be capable of turning against a base plate 62 are provided at the rear tip of the holding portion 60a.

The base plate 62 is made of a board-like member in approximately a rectangular shape and includes, by providing a stepped portion 62a in the middle part in the longitudinal direction, a lower plane portion 62b is set ahead of the stepped portion 62a and an upper plane portion 62c is set on the rear side thereof. The flashlight device 33 is loaded ahead the upper part of the stepped portion 62a and a microphone device 34 and an accessory shoe 35 are loaded at the rear side thereof. For that, a pair of bearing pieces 63, 63 for supporting the stroboscope frame 60 to be capable of turning are provided on the upper part of the stepped portion 62a so as to be opposed to each other in the width direction at a predetermined interval.

A pair of supporting pieces 60C, 60C are interposed between the pair of bearing pieces 63, 63 and the stroboscope frame 60 is supported on the base plate 62 by a supporting shaft 64 inserted into the pair of bearing pieces 63, 63 and the pair of supporting pieces 60C, 60C. Further, a pop-up spring 65 is loaded to the supporting shaft 64 and, by locking one end of the spring piece to the base plate 62 and the other spring piece to the stroboscope frame 60, the stroboscope frame 60 is always being urged in the direction in a way to move away from the lower plane portion 62b due to the spring force.

On the stepped portion 62a side of the lower plane portion 62b are provided a turning lever 66 for locking the flashlight device 33 in a storage position and the plunger mechanism 67 for activating the turning lever 66 to release the locking. The turning lever 66 includes an arm-like member with its plane shape being formed into an L shape and is supported to be capable of turning on the lower plane portion 62b by an axis inserted to be capable of turning in the middle part of one arm piece. A lock nail 66a raised upward is provided at the front end of this arm piece. Further, a coupling pin 66b projected upward is provided at a portion at which two arms intersect each other.

A core 70 of the plunger mechanism 67 is engaged with the coupling pin 66b of the turning lever 66 to be capable of turning. The plunger mechanism 67 is formed of the core 70 that is a movable part linearly moving forward and backward between a predetermined distance and a holder 71 for holding a coil inserted in the core 70. Depending on whether the plunger mechanism 67 is applied with a current or not, the turning lever 66 is activated to release the rocking of the stroboscope frame 60 or not, which will be explained later on.

Further, a stopper member 73 is fixed to the lower plane portion 62b of the base plate 62 with fixing means such as screws and the like to prevent the stroboscope frame 60 from springing up higher than predetermined. A pair of stopper receiving pieces 73a, 73a are provided on both sides in the width direction of the stroboscope frame 60 to be opposed to each other. The stopper receiving pieces 73a, 73a have long holes extending in the upper-to-lower direction and protruding stoppers 74, 74 provided on both sides in the width direction of the stroboscope frame 60 are slidably inserted into the holes, respectively.

A stroboscope cabinet 75 is detachably provided to the stroboscope frame 60. The stroboscope cabinet 75 includes an upper surface portion 75a for covering the upper surface of the stroboscope frame 60, a front portion 75b and side surface portions 75c, 75c for covering both left and right side surfaces. The upper surface portion 75a of the stroboscope frame 60 is slightly bulged upward in a dome-like fashion. In addition, a notch 75e is provided to the front portion 75b where the front piece 61 is fit in.

Figure 6:
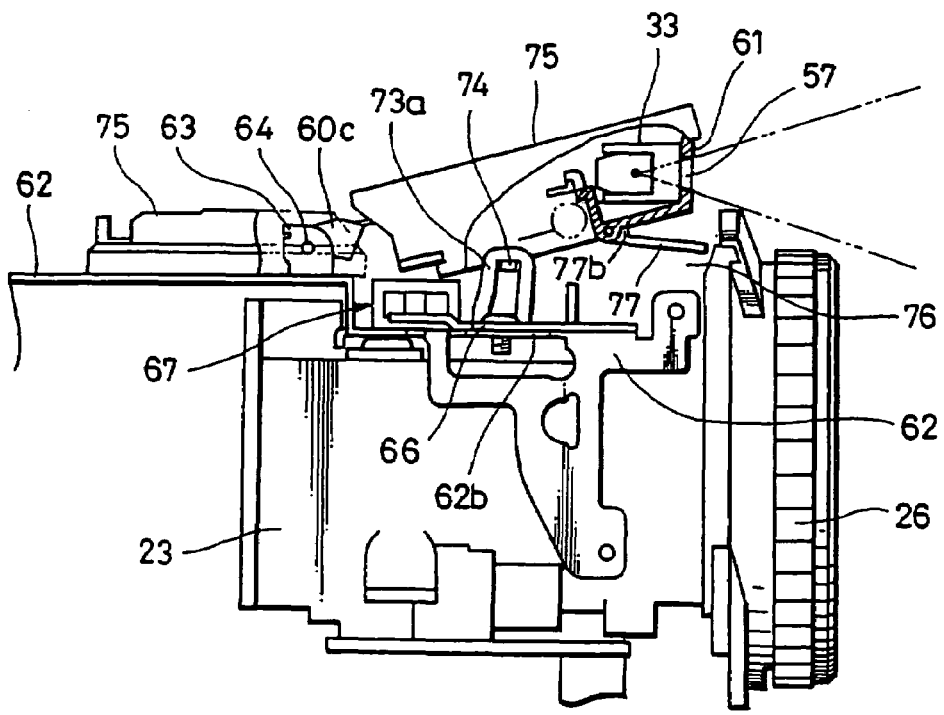
FIG. 6 is an explanatory view of a state in which the flashlight device of the camcorder shown in FIG. 1 is made to spring up to the pop-up position.
Figure 7:
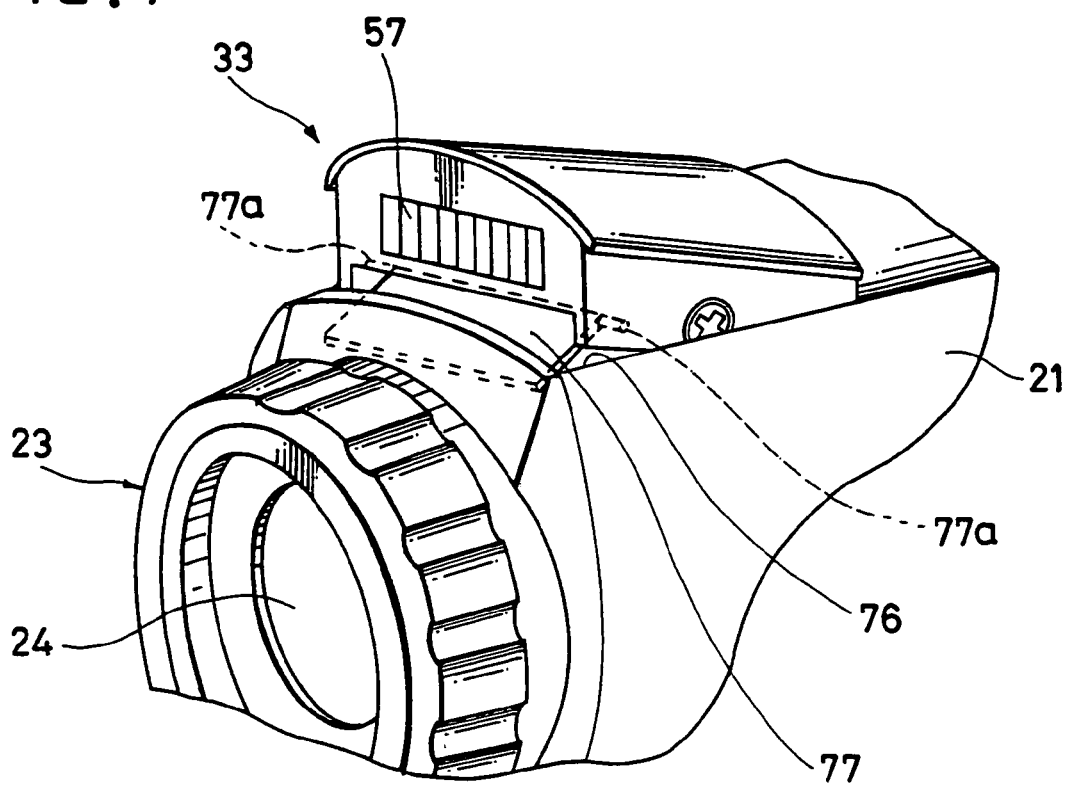
FIG. 7 is an explanatory view in which the flashlight device of the camcorder shown in FIG. 2 is enlarged.

Furthermore, as is shown in an enlarged manner, a blindfolding board 77 is attached to the lower surface of the lower plane portion 62b of the base plate 62 to be capable of turning for covering the inside of a stroboscope storage portion 76 after the flashlight device 33 is moved to the pop-up position. The blindfolding board 77 is formed of an approximately square shaped board-like member, which is pivotally supported on the lower plane portion 62b by a pair of shafts 77a, 77a respectively projecting laterally in the rear part. As shown in FIG. 6, a projecting portion 77b for restricting a downward turn is provided in the vicinity of one shaft pin 77a of the blindfolding board 77. As the result, as shown in FIG. 6, when the flashlight device 33 is moved to the pop-up position, the blindfolding board 77 is bent forward under its own weight and ascends while maintaining a roughly horizontal state. Consequently, the opening portion of the stroboscope storage portion 76 is closed in a way to put a lid with the blindfolding board 77.

As materials for the above-mentioned stroboscope frame 60, base plate 62 and stopper member 73, stainless alloy, aluminum alloy or other metal materials may be preferable, for example, but engineering plastic and other materials may also be used. In addition, as for materials for the stroboscope cabinet 75, engineering plastic may be preferable, for example, aluminum alloy, stainless steel and other metal materials may also be used.

Figure 5:
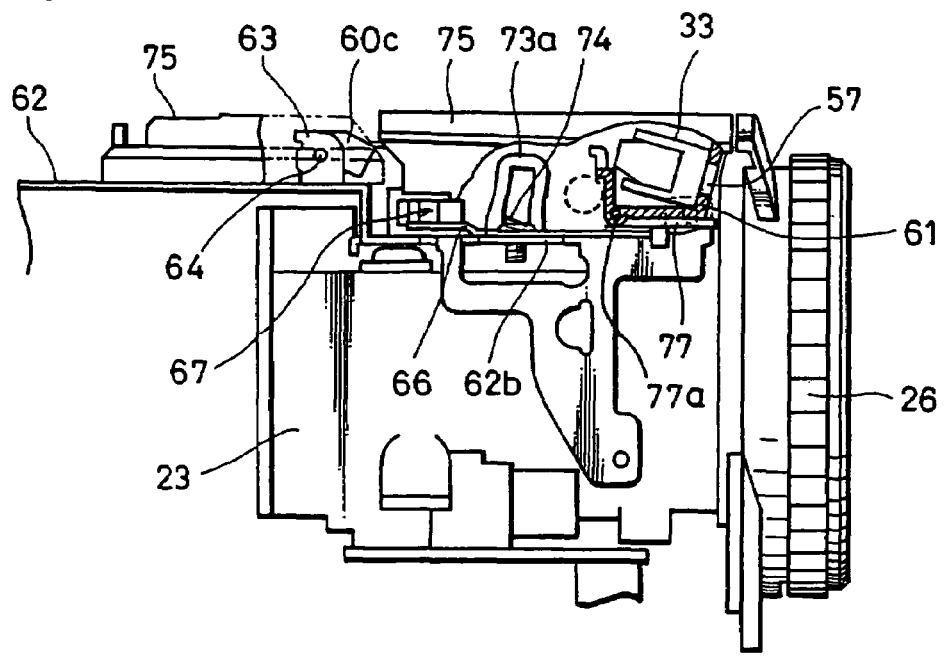
FIG. 5 is an explanatory view of a state in which the flashlight device of the camcorder shown in FIG. 1 is stored in the storage position.

The pop-up operation of the flashlight device 33 having such a constitution will be explained with reference to FIGS. 5 and 6. FIG. 5 shows the flashlight device 33 in the state of being stored in the storage position provided in the lower plane portion 62b of the base plate 62, and FIG. 6 shows the flashlight device 33 in the operational state of being popped up and moved to the pop-up position.

In the state shown in FIG. 5, since part of the stroboscope frame 60 is engaged with the lock nail 66a of the turn lever 66, the flashlight device 33 is held in the storage position. By operating the plunger mechanism 67 from this state so as to move the core 70 forward, the turning lever 66 is turned in the counter-clock-wise direction in FIG. 4. As the result, with the release of the locking of the stroboscope frame 60 by the lock nail 66a, the stroboscope frame 60 is made to spring up with the spring force.

Hence, the posture of the stroboscope frame 60 shown in FIG. 5 (the state in FIG. 1) switches to the posture shown in FIG. 6 (the state in FIG. 2) and the Fresnel lens portion 57 that is the light emitting part of the flashlight device 33 becomes exposed, so that light emitting operations become possible. At this time, as is shown in FIG. 6, the stopper 74 of the stroboscope frame 60 comes in contact with the upper fringe of an oblong hole of the stopper receiving piece 73a of the stopper member 73 fixed to the base plate 62, which leads to preventing further springing up of the stroboscope frame. In addition, the free end side of the blindfolding board 77 becomes a roughly horizontal state under its own weight and changes into the posture of covering the storage position to hide the inside of the stroboscope storage portion 76.

Figure 8:
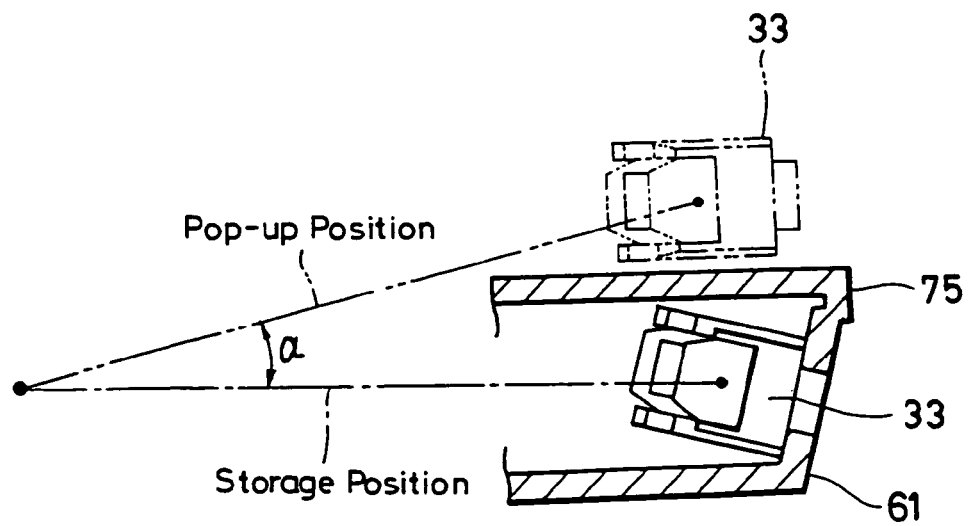
FIG. 8 is an explanatory view for explaining a pop-up angle of the flashlight device according to an imaging apparatus of the present invention.

In this case, as is shown in FIG. 8, a pop-up angle α of the flashlight device is as small as about 15 degrees. According to the embodiment, although the pop-up angle is so small, it is possible to move a pop-up angle to the predetermined position so as to carry out a normal light emitting operation. Contrary to this, the pop-up angle β of a conventional flashlight device is as large as about 35 degrees comparatively, as is shown in FIG. 15. Accordingly, in the case of this embodiment, the pop-up angle of the camcorder can be miniaturized to the extent of reduction in the pop-up angle.

Next, at a time of storing the flashlight device 33 in the storage position, the stroboscope cabinet 75 is pressed toward the lower plane portion 62b side against the spring force of the pop-up spring 65. As the result, the stroboscope frame 60 moves downward against the resistance force of the core 70 side and the rock nail 66a performs a retreating operation due to a pressing force. Then, when the rock nail 66a is back in place, the rock nail 66a climbs over an engaged part to be engaged with the lower plane portion 62b. Consequently, the posture of the flashlight device 33 changes from the state shown in FIG. 6 to the state shown in FIG. 5 and the flashlight device 33 is locked in the storage position.

Figure 9:
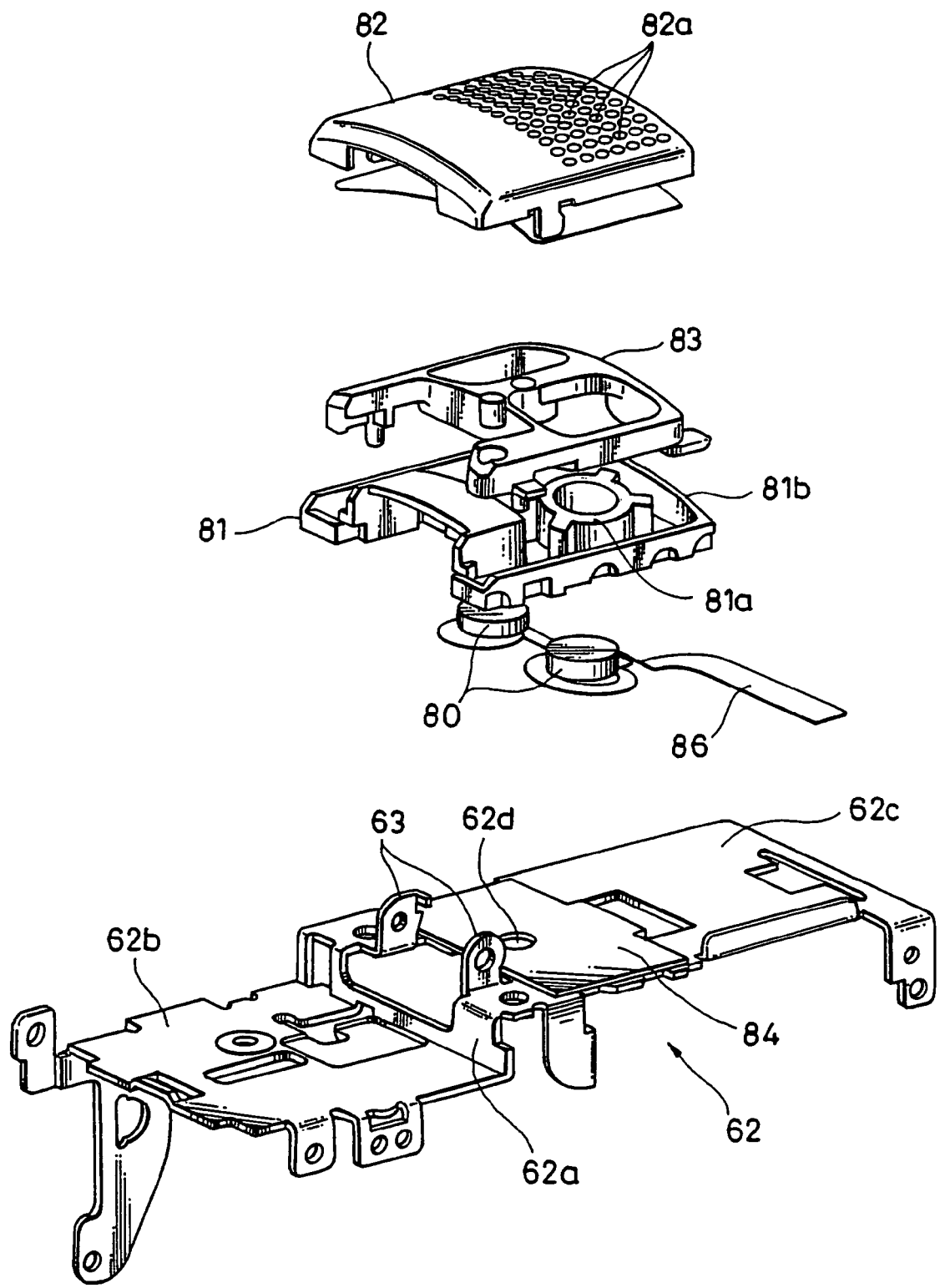
FIG. 9 is an exploded perspective view of a microphone unit of the camcorder shown in FIG. 1.
Figure 10:
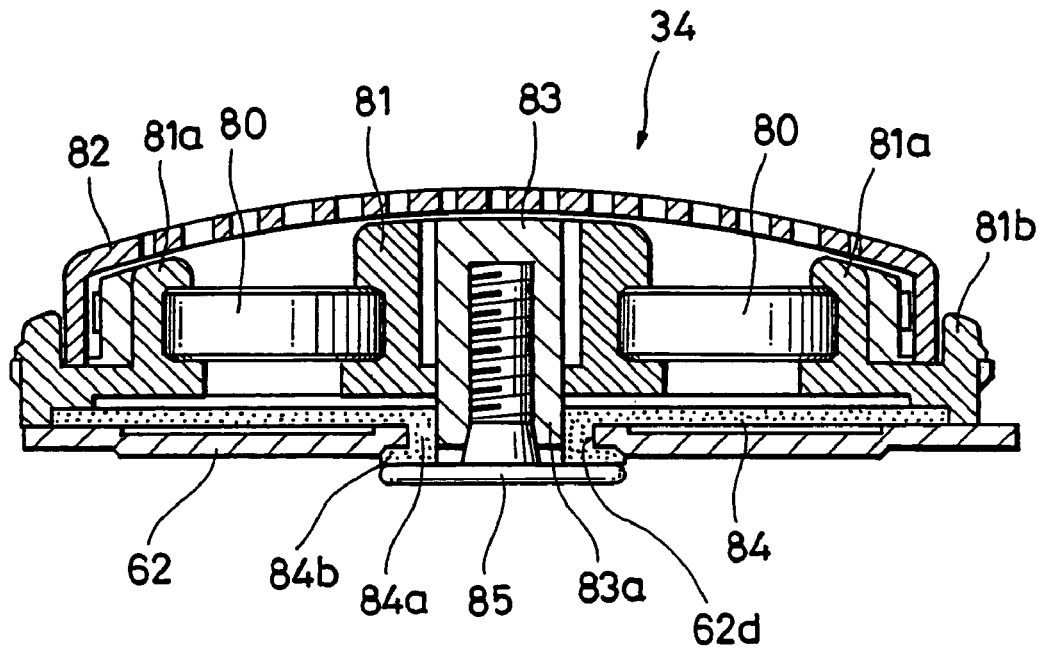
FIG. 10 is a cross-sectional view of the microphone according to the imaging apparatus of the present invention.

The microphone device 34 has such a stereo-structure that is capable of individually collecting left sound and right sound and includes a constitution shown in FIGS. 9 and 10. That is, the microphone device 34 includes: two microphone elements 80, 80; a cushion member 81 to elastically support this pair of microphone elements 80, 80; an outside cabinet 82 to cover the surface side of the cushion member 81; an inside cabinet 83 interposed between the outside cabinet 82 and cushion member 81; a rear lid 84 to cover the rear surface side of the cushion member 81; and a fixing screw 85 to fix the rear lid 84 to the inside cabinet 83.

The pair of microphone elements 80, 80 are electrically connected with each other by maintaining a predetermined interval with a flexible print circuit board (hereinafter, referred to as "flexi-board") 86. The pair of microphone elements 80, 80 are respectively fit in a cylinder-like boss portion 81a of the cushion member 81 formed of a rubber-like elastic body. At the boss portion 81a, each microphone element 80 is floatingly and elastically supported with the cushion member 81. On one surface side of the cushion member 81, there is provided a surrounding fringe 81b to surround its peripheral part.

The upper surface of the outside cabinet 82 is formed into a dome-like shape with the same curved surface corresponding to the stroboscope cabinet 75. A number of sound-collecting holes 82a are provided to be opposed to the pair of microphone elements 80, 80. The inside cabinet 83 is integrally fit in and fixed to the inside of the outside cabinet 82. The inside cabinet 83 is formed of a frame-like member with a strung crosspiece avoiding a part that is opposed to the pair of microphone elements 80, 80 and a front side part, and a screw shaft portion 83a is provided approximately at the central portion of an inner surface to project downward. This screw shaft portion 83a is inserted into a hole approximately at the central portion of the cushion member 81.

The rear lid 84 is formed into a board-like shape with a rubber-like elastic body and a cylinder-like boss portion 84a projecting toward one surface side is provided approximately at the center thereof. A flange portion 84b extended outside in the radius direction is provided at the tip of the boss portion 84a of the rear lid 84. The cylinder-like boss portion 84a is fit in a through-hole 62d provided on the upper plane portion 62c of the base plate 62. The flange portion 84b is pressed to be in contact with the upper plane portion 62c with the screwing of a fixing screw 85 and the microphone device 34 is elastically supported through the cushion member 81 and rear lid 84 respectively made of rubber-like elastic bodies.

As materials for the outside cabinet 82 and inside cabinet 83, for example, engineering plastic may be preferable, but aluminum alloy or other metal materials can also be used.

The microphone device 34 having such a constitution can be assembled without difficulties in the following way, for example. First, the pair of microphone elements 80, 80 is loaded to the boss portion 81a of the cushion member 81. Next, the cushion member 81 with the microphone elements 80 loaded thereto is attached to the outside cabinet 82 with the inside cabinet 83 fixed thereto beforehand.

Next, the cushion member 81 with the cabinet loaded thereto is made to face the rear lid 84 fixed to the base plate 62 in advance. At this time, the rear lid 84 has the boss portion 84a fit in the through-hole 62d on the upper plane portion 60c with the flange portion 84b facing downward. The cushion member 81 is superposed upon the rear lid 84 and the fixing screw is engaged with the screw shaft portion 83a of the inside cabinet 83 from the flange portion 84b side. By screwing the fixing screw 85, the microphone device 34 is elastically supported on the base plate 62 through the rear lid 84 and cushion member 81.

According to the embodiment, since the rear lid 84 and cushion member 81 respectively made of the rubber-like elastic bodies come in contact with the base plate 62 on the exterior case 21 side and no member with high rigidity is disposed between the base plate 62 and pair of microphone elements 80, 80, it is possible not to pick up unnecessary sounds coming circuitously from the inside of the electronic device. Further, since the cushion member 81 is disposed between the outside and inside cabinets 82, 83 and pair of microphone elements 80, it is possible not to pick up vibrating sounds transmitted through the cabinets, frame and the like.

INDUSTRIAL APPLICABILITY

The present invention is not limited to the embodiment described above and shown in the drawings and it is to be understood that various changes and modifications can be effected without departing from the spirit or scope of the present invention. In the embodiment described above, explanation is made with respect to the case where the present invention is applied to, for example, a camcorder, but the invention can be applied to a still camera, digital still camera and other camera devices.

The invention claimed is:

1. An imaging apparatus comprising:
an exterior case to which a lens device is attached;
a base plate supported in the vicinity of an objective lens of said lens device;
a flashlight device pivotally connected to the base plate and capable of moving between a pop-up position and a storage position through a turning arm;
spring means that makes said flashlight device pop up to be urged to said pop-up position, the spring means in contact with the base plate and the flashlight device; and
holding means for holding said flashlight device in said storage position, the holding means fixedly connected to the base plate and releasably connected to the flashlight device in the storage position;
wherein a light emitting portion faces the front of a subject in the pop-up position and
wherein the flashlight device includes a reflecting mirror having a pair of first reflecting surfaces disposed apart from and generally facially opposing one another and a second reflecting surface interconnecting the pair of first reflecting surfaces to form a generally U-shaped configuration, the second reflecting surface as viewed in cross-section having an upper front side cylindrical surface section extending arcuately at a constant radius of curvature about a center point, a lower front side cylindrical surface section extending arcuately at the constant radius of curvature about the center point, a rear side cylindrical surface section extending arcuately at the constant radius of curvature about the center point, an upper recessed surface section interconnecting the upper front side cylindrical surface section and the rear side cylindrical surface section and projecting away from the center point and a lower recessed surface section interconnecting the lower front side cylindrical surface section and the rear side cylindrical surface section and projecting away from the center point.

2. An imaging apparatus according to claim 1, wherein said flashlight device is disposed in the upper direction of said holding means and adjacently in the vicinity of said objective lens.

3. An imaging apparatus according to claim 1, further comprising a blindfolding board provided on the lower surface of said flashlight device for covering said storage position when the flashlight device is moved to said pop-up position.

4. An imaging apparatus according to claim 3, wherein said blindfolding board has a pair of shaft portions projecting in directions opposite to each other on the same axis line and said pair of shaft portions are supported by both ends at the lower part of said flashlight device, and said blindfolding board is capable of turning in the range of predetermined angles using its own weight.

5. An imaging apparatus according to claim 3, wherein a plunger mechanism is disposed in the lower direction of said blindfolding board for popping up said flashlight device.

6. An imaging apparatus according to claim 1, wherein each one of the upper recessed surface section and the lower recessed surface section includes, as viewed in cross-section, a first flat surface and a second flat surface connected to the first flat surface to form a generally V-shaped configuration.

7. An imaging apparatus according to claim 6, wherein the upper front side cylindrical surface section is connected to and disposed between one of the pair of first reflecting surfaces and the first flat surface of the upper recessed surface section and the lower front side cylindrical surface is connected to and disposed between a remaining one of the pair of first reflecting surfaces and the first flat surface of the lower recessed surface section.

8. An imaging apparatus according to claim 7, wherein the second flat surface of the upper recessed surface section is connected to and disposed between the first flat surface of the upper recessed surface section and a first end of the rear side cylindrical surface section and the second flat surface of the lower recessed surface section is connected to and disposed between the first flat surface of the lower recessed surface section and a second end of the rear side cylindrical surface section disposed opposite the first end of the rear side cylindrical surface section.

9. An imaging apparatus according to claim 1, wherein the second reflecting surface defines an inverted generally C-shaped hole and the center point is disposed in the inverted generally C-shaped hole.

10. An imaging apparatus according to claim 1, wherein the second reflecting surface defines a tube-receiving hole and the center point is disposed in the tube-receiving hole.

11. An imaging apparatus according to claim 1, wherein each one of the pair of first reflecting surfaces, as viewed in cross-section, has a curved configuration forming a concavity, respective ones of the concavities generally facing one another.

* * * * *